(12) United States Patent
Tiu et al.

(10) Patent No.: US 11,308,136 B2
(45) Date of Patent: Apr. 19, 2022

(54) DIFFERENT DATA SOURCES FOR REGIONS IN GEOGRAPHICAL HIERARCHIES

(71) Applicant: SAP SE, Walldorf (DE)

(72) Inventors: Jonathan Tiu, Surrey (CA); Christopher Bolognese, Vancouver (CA); Anthony Kohan, Vancouver (CA); Fangzhou Yin, Vancouver (CA); Sumedha Sharma, Vancouver (CA); James Lloyd, Vancouver (CA)

(73) Assignee: SAP SE, Walldorf (DE)

( * ) Notice: Subject to any disclaimer, the term of this patent is extended or adjusted under 35 U.S.C. 154(b) by 839 days.

(21) Appl. No.: 16/107,682

(22) Filed: Aug. 21, 2018

(65) Prior Publication Data

US 2020/0065402 A1   Feb. 27, 2020

(51) Int. Cl.
*G06F 16/29* (2019.01)
*G06F 16/27* (2019.01)
*G06F 3/0482* (2013.01)
*G01C 21/36* (2006.01)

(52) U.S. Cl.
CPC .............. *G06F 16/29* (2019.01); *G06F 16/27* (2019.01); *G01C 21/3605* (2013.01); *G01C 21/3667* (2013.01); *G06F 3/0482* (2013.01)

(58) Field of Classification Search
USPC ......................................................... 707/770
See application file for complete search history.

(56) References Cited

U.S. PATENT DOCUMENTS

| | | | | |
|---|---|---|---|---|
| 2008/0228783 A1* | 9/2008 | Moffat | .................... | G06F 16/29 |
| 2016/0033295 A1* | 2/2016 | Li | ............................ | G06T 3/40 |
| | | | | 345/660 |
| 2016/0070983 A1* | 3/2016 | Watts | ................. | G01C 21/3679 |
| | | | | 382/201 |
| 2016/0162512 A1* | 6/2016 | Battistini | ............ | G06F 16/9537 |
| | | | | 707/804 |

* cited by examiner

*Primary Examiner* — Muluemebet Gurmu
(74) *Attorney, Agent, or Firm* — Fountainhead Law Group P.C.

(57) ABSTRACT

Some embodiments provide a non-transitory machine-readable medium that stores a program. The program receives an input specifying a location field of a dataset. In response to the input, the program further retrieves a set of geographical hierarchy definitions. The program also retrieves, from the data source specified for a level in the geographical hierarchy defined by a geographical hierarchy definition in the set of geographical hierarchy definitions, a subset of a set of geometries representing a set of geographical regions belonging to the level in the geographical hierarchy. For each geometry in the subset of the set of geometries, at least one record in the dataset has a spatial point in a location field that falls within the geometry. The program further provides the subset of the set of geometries in a view of a map.

20 Claims, 18 Drawing Sheets

| ID 205 | Hierarchy Name 210 | Hierarchy ID 215 | Level 220 | Level Name 225 | Data Source 230 | |
|---|---|---|---|---|---|---|
| 1 | Geographical Regions | 1 | 1 | Country | Data Source 145a | ← 232 |
| 2 | Geographical Regions | 1 | 2 | Region | Data Source 145a | ← 234 |
| 3 | Geographical Regions | 1 | 3 | Subregion 1 | Data Source 145a | ← 236 |
| 4 | Geographical Regions | 1 | 4 | Subregion 2 | Data Source 145a | ← 238 |
| 5 | Sales Regions | 2 | 1 | Country | Data Source 145a | ← 240 |
| 6 | Sales Regions | 2 | 2 | Sales Region | Data Source 145d | ← 242 |
| 7 | Sales Regions | 2 | 3 | Sales Subregion | Data Source 145d | ← 244 |
| 8 | Marketing Regions | 3 | 1 | Marketing Region | Data Source 145c | ← 246 |
| 9 | Marketing Regions | 3 | 2 | Marketing Subregion | Data Source 145b | ← 248 |

| Geometry Definition | Geometry ID | Name |
|---|---|---|
| Geometry 1 | 1 | United States |
| Geometry 2 | 2 | Canada |
| Geometry 3 | 3 | Mexico |
| ⋮ | ⋮ | ⋮ |
| Geometry *n* | *n* | Country *n* |

305 — Geometry Definition; 310 — Geometry ID; 315 — Name

| Geometry Definition | Geometry ID | Name |
|---|---|---|
| Geometry 1 | 101 | Alabama |
| Geometry 2 | 102 | Alaska |
| Geometry 3 | 103 | Arizona |
| ⋮ | ⋮ | ⋮ |
| Geometry 150 | 150 | Wyoming |

405 — Geometry Definition; 410 — Geometry ID; 415 — Name

| Geometry Definition | Geometry ID | Name |
|---|---|---|
| Geometry 1 | 180 | West Region |
| Geometry 2 | 181 | Central Region |
| Geometry 3 | 182 | East Region |

505 — Geometry Definition; 510 — Geometry ID; 515 — Name

```
Geometry ID 1
    2: True
    3: True
    4: True

Geometry ID 2
    2: True
    3: False
    4: False

•
        •
        •

Geometry ID 102
    3: False
    4: True

Geometry ID 103
    3: True
    4: True

DIFFERENT DATA SOURCES FOR REGIONS IN GEOGRAPHICAL HIERARCHIES

BACKGROUND

Maps and mapping technology are used in many current computing and mobile applications and services. For example, some applications or services utilize mapping technology to provide navigation functions, location functions, traffic congestion functions, etc. Other applications or services may employ mapping technology to provide location-based search functions, social-networking functions, ride-sharing services, etc. In addition, some applications or services can use maps to present data that has a geographical component associated with it.

SUMMARY

In some embodiments, a non-transitory machine-readable medium stores a program. The program receives an input specifying a location field of a dataset. The dataset includes a set of records. Each record in the set of records includes the location field and a set of fields. The location field is configured to store a spatial point. In response to the input, the program further retrieves a set of geographical hierarchy definitions. Each geographical hierarchy definition in the set of hierarchy definitions includes a number of levels in a geographical hierarchy and a data source for each level in the geographical hierarchy. The program also retrieves, from the data source specified for a level in the geographical hierarchy defined by a geographical hierarchy definition in the set of geographical hierarchy definitions, a subset of a set of geometries representing a set of geographical regions belonging to the level in the geographical hierarchy. For each geometry in the subset of the set of geometries, at least one record in the dataset has a spatial point in the location field that falls within the geometry. The program further provides the subset of the set of geometries in a view of a map.

In some embodiments, the set of geometries representing the set of geographical regions may be a first set of geometries representing a first set of geographical regions. The program may further receive a selection of a second level in the geographical hierarchy defined by the geographical hierarchy definition; and, in response to the selection of the second level, retrieve, from the data source specified for the second level in the geographical hierarchy, a subset of a second set of geometries representing a second set of geographical regions belonging to the second level in the geographical hierarchy. Each geometry in the subset of the second set of geometries has at least one record in the dataset with a spatial point in the location field that may fall within the geometry. The data source specified for the second level in the geographical hierarchy and the data source specified for the first level in the geographical hierarchy may be different data sources.

In some embodiments, the geographical hierarchy defined by the geographical hierarchy definition in the set of geographical hierarchy definitions may be a first geographical hierarchy defined by a first geographical hierarchy definition in the set of geographical hierarchy definitions. The set of geometries representing the set of geographical regions may be a first set of geometries representing a first set of geographical regions. The program may further receive a selection of a second geographical hierarchy defined by a second geographical hierarchy definition in the set of geographical hierarchy definitions; and, in response to the selection of the second geographical hierarchy definition, retrieve, from the data source specified for a level in the second geographical hierarchy, a subset of a second set of geometries representing a second set of geographical regions belonging to the level in the second geographical hierarchy. Each geometry in the subset of the second set of geometries has at least one record in the dataset with a spatial point in the location field that may fall within the geometry. The data source specified for the second level in the second geographical hierarchy and the data source specified for the first level in the first geographical hierarchy may be different data sources.

In some embodiments, retrieving the set of geographical hierarchy definitions may include generating a query for the set of geographical hierarchy definitions, sending the query to a computing system for execution, and receiving the set of geographical hierarchy definitions from the computing system. Retrieving the set of geographical hierarchy definitions may include generating a query for the set of geographical hierarchy definitions, executing the query on a database of the device, and receiving the set of geographical hierarchy definitions from the database.

In some embodiments, a method receives an input specifying a location field of a dataset. The dataset includes a set of records. Each record in the set of records includes the location field and a set of fields. The location field is configured to store a spatial point. In response to the input, the method further retrieves a set of geographical hierarchy definitions. Each geographical hierarchy definition in the set of hierarchy definitions includes a number of levels in a geographical hierarchy and a data source for each level in the geographical hierarchy. The method also retrieves, from the data source specified for a level in the geographical hierarchy defined by a geographical hierarchy definition in the set of geographical hierarchy definitions, a subset of a set of geometries representing a set of geographical regions belonging to the level in the geographical hierarchy. For each geometry in the subset of the set of geometries, at least one record in the dataset has a spatial point in the location field that falls within the geometry. The method further provides the subset of the set of geometries in a view of a map.

In some embodiments, the set of geometries representing the set of geographical regions may be a first set of geometries representing a first set of geographical regions. The method may further receive a selection of a second level in the geographical hierarchy defined by the geographical hierarchy definition; and, in response to the selection of the second level, retrieve, from the data source specified for the second level in the geographical hierarchy, a subset of a second set of geometries representing a second set of geographical regions belonging to the second level in the geographical hierarchy. Each geometry in the subset of the second set of geometries has at least one record in the dataset with a spatial point in the location field that may fall within the geometry. The data source specified for the second level in the geographical hierarchy and the data source specified for the first level in the geographical hierarchy may be different data sources.

In some embodiments, the geographical hierarchy defined by the geographical hierarchy definition in the set of geographical hierarchy definitions may be a first geographical hierarchy defined by a first geographical hierarchy definition in the set of geographical hierarchy definitions. The set of geometries representing the set of geographical regions may be a first set of geometries representing a first set of geographical regions. The method may further receive a selection of a second geographical hierarchy defined by a second geographical hierarchy definition in the set of geographical hierarchy definitions; and, in response to the selection of the second geographical hierarchy definition, retrieve, from the data source specified for a level in the second geographical hierarchy, a subset of a second set of geometries representing a second set of geographical regions belonging to the level in the second geographical hierarchy. Each geometry in the subset of the second set of geometries has at least one record in the dataset with a spatial point in the location field that may fall within the geometry. The data source specified for the second level in the second geographical hierarchy and the data source specified for the first level in the first geographical hierarchy may be different data sources.

In some embodiments, retrieving the set of geographical hierarchy definitions may include generating a query for the set of geographical hierarchy definitions, sending the query to a computing system for execution, and receiving the set of geographical hierarchy definitions from the computing system. Retrieving the set of geographical hierarchy definitions may include generating a query for the set of geographical hierarchy definitions, executing the query on a database of the device, and receiving the set of geographical hierarchy definitions from the database.

In some embodiments, a system includes a set of processing units and a non-transitory machine-readable medium that stores instructions. The instructions cause at least one processing unit to receive an input specifying a location field of a dataset. The dataset includes a set of records. Each record in the set of records includes the location field and a set of fields. The location field is configured to store a spatial point. In response to the input, the instructions further cause the at least one processing unit to retrieve a set of geographical hierarchy definitions. Each geographical hierarchy definition in the set of hierarchy definitions includes a number of levels in a geographical hierarchy and a data source for each level in the geographical hierarchy. The instructions also cause the at least one processing unit to retrieve, from the data source specified for a level in the geographical hierarchy defined by a geographical hierarchy definition in the set of geographical hierarchy definitions, a subset of a set of geometries representing a set of geographical regions belonging to the level in the geographical hierarchy. For each geometry in the subset of the set of geometries, at least one record in the dataset has a spatial point in the location field that falls within the geometry. The instructions further cause the at least one processing unit to provide the subset of the set of geometries in a view of a map.

In some embodiments, the set of geometries representing the set of geographical regions may be a first set of geometries representing a first set of geographical regions. The instructions may further cause the at least one processing unit to receive a selection of a second level in the geographical hierarchy defined by the geographical hierarchy definition; and, in response to the selection of the second level, retrieve, from the data source specified for the second level in the geographical hierarchy, a subset of a second set of geometries representing a second set of geographical regions belonging to the second level in the geographical hierarchy. Each geometry in the subset of the second set of geometries has at least one record in the dataset with a spatial point in the location field that may fall within the geometry. The data source specified for the second level in the geographical hierarchy and the data source specified for the first level in the geographical hierarchy may be different data sources.

In some embodiments, the geographical hierarchy defined by the geographical hierarchy definition in the set of geographical hierarchy definitions may be a first geographical hierarchy defined by a first geographical hierarchy definition in the set of geographical hierarchy definitions. The set of geometries representing the set of geographical regions may be a first set of geometries representing a first set of geographical regions. The instructions may further cause the at least one processing unit to receive a selection of a second geographical hierarchy defined by a second geographical hierarchy definition in the set of geographical hierarchy definitions, and, in response to the selection of the second geographical hierarchy definition, retrieve, from the data source specified for a level in the second geographical hierarchy, a subset of a second set of geometries representing a second set of geographical regions belonging to the level in the second geographical hierarchy. Each geometry in the subset of the second set of geometries has at least one record in the dataset with a spatial point in the location field that may fall within the geometry. The data source specified for the second level in the second geographical hierarchy and the data source specified for the first level in the first geographical hierarchy may be different data sources.

In some embodiments, retrieving the set of geographical hierarchy definitions may include generating a query for the set of geographical hierarchy definitions, sending the query to a computing system for execution, and receiving the set of geographical hierarchy definitions from the computing system.

The following detailed description and accompanying drawings provide a better understanding of the nature and advantages of the present invention.

BRIEF DESCRIPTION OF THE DRAWINGS

FIG. 2 illustrates an example table defining geographical hierarchies according to some embodiments.

FIG. 3 illustrates an example table of geometry data for a level of a geographical hierarchy defined in the table illustrated in FIG. 2 according to some embodiments.

FIG. 4 illustrates another example table of geometry data for a level of a geographical hierarchy defined in the table illustrated in FIG. 2 according to some embodiments.

FIG. 5 illustrates another example table of geometry data for a level of a geographical hierarchy defined in the table illustrated in FIG. 2 according to some embodiments.

FIG. 8 illustrates example geometry data used for focus operations according to some embodiments.

DETAILED DESCRIPTION

Figure 1:
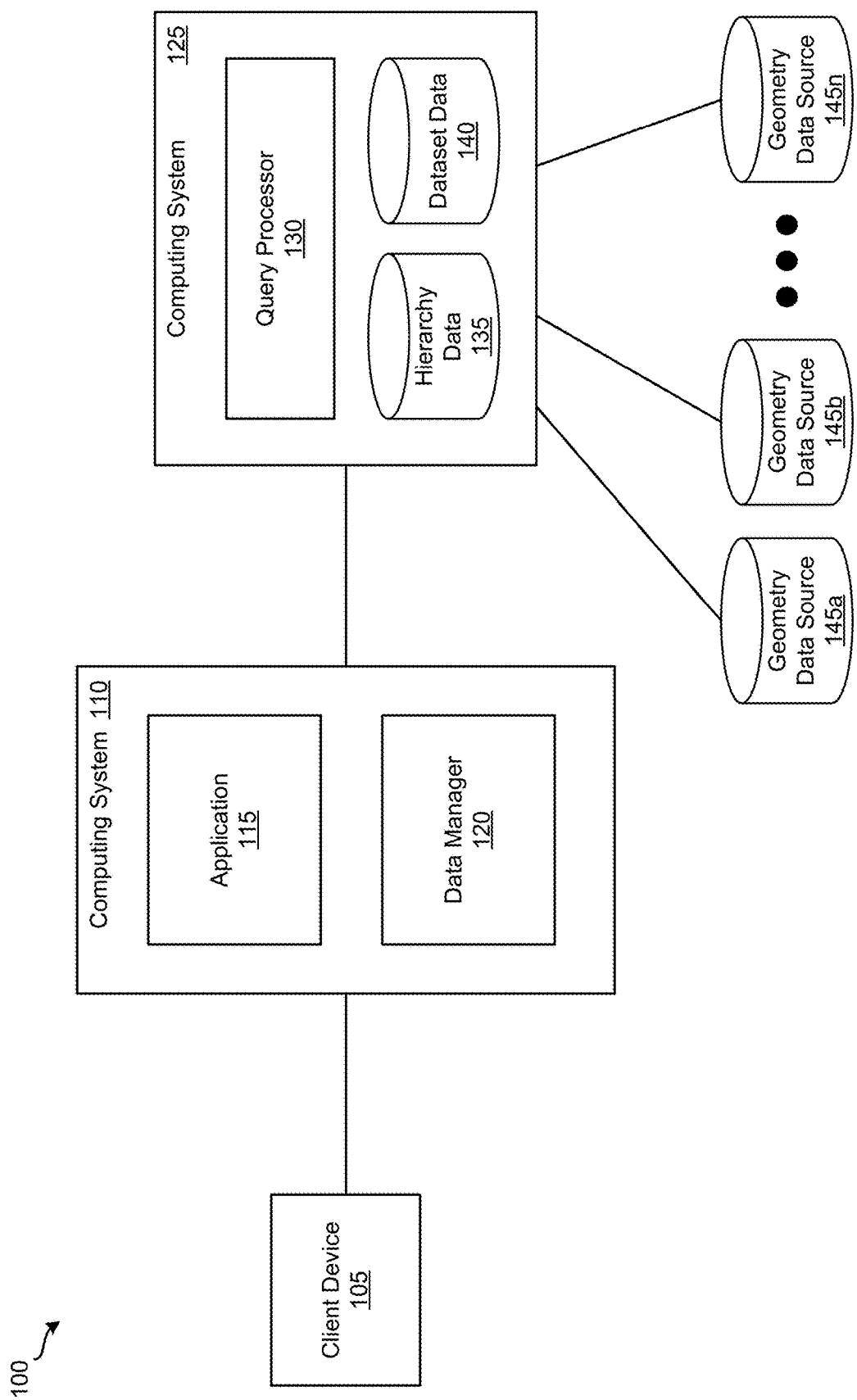
FIG. 1 illustrates a system according to some embodiments.

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for providing geographical regions of geographical hierarchies according to some embodiments. In some embodiments, a system includes a client device, a first computing system, a second computing system, and several geometry data sources. A user of the client may provide the first computing system with input specifying a location field of a dataset that stores spatial points. In response, the first computing system can retrieve from the second computing system a set of geographical hierarchies of geographical regions and provide them to the client device. The user of the client device may select one of the geographical hierarchies. Based on the selected geographical hierarchy, the first computing system retrieves from a geometry data source, via the second computing system, geometry data associated with the geographical regions belonging to a level in the selected geographical hierarchy that encompass spatial point data in the dataset. Then, the first computing system provides the client device a view of a map along with the geometry data.

The user of the client device can select a different level in the selected geographical hierarchy. In response, the first computing system may retrieve from the same or different geometry data source, via the second computing system, geometry data associated with the geographical regions belonging to the selected, different level in the geographical hierarchy that encompass spatial point data in the dataset and provides the client device a view of a map with the geometry data. The user of the client device can also select a different geographical hierarchy to use for viewing data in the dataset. Based on the different selected geographical hierarchy and the dataset, the first computing system retrieves from a previous or another geometry data source, via the second computing system, geometry data associated with the geographical regions belonging to a level in the different selected geographical hierarchy that encompass spatial point data in the dataset. The first computing system then provides the client device a view of a map with the geometry data.

Furthermore, in some embodiments, the system provides a feature for focusing on geographical regions of geographical hierarchies. For example, the user of the client device may select an option to focus on a geographical region that belongs to a geographical hierarchy. In response, the first computing system can determine whether a lower level in the geographical hierarchy is available for viewing data in the dataset. If the first computing system determines that a lower level in the geographical hierarchy is available, the first computing system retrieves from the second computing system geometries of geographical regions in the lower level of the geographical hierarchy that encompass spatial point data in the dataset and provides the client device the geometries with a view of a map. Otherwise, the first computing system retrieves from the second computing system spatial point data in the dataset encompassed by the geographical region on which the option was selected to focus. The first computing system provides the client device with a view of a map that includes the geometry of the geographical region and the spatial data points encompassed by it.

The techniques described in the present application provide a number of benefits and advantages over conventional geographical hierarchies. Many aspects of the techniques described in the present application related to geographical hierarchies provide more flexibility than conventional geographical hierarchies. For instance, hierarchy data for defining geographical hierarchies can be implemented in different systems (e.g., a local system, a remote system, etc.). In addition, any number of different geographical hierarchies can be defined for the system. Geographical hierarchies can be added, edited, or deleted from the system. Further, different data sources can be used for storing the different set of geometries that represent geographical regions. Different data sources can be specified as sources of geometry data for different hierarchies. Different data sources can be specified as sources of geometry data for different levels in the same geographical hierarchy.

Moreover, the techniques described in the present application related to focus operations provide faster performance over convention methods. For example, in some instances, a query for data in a dataset includes a request for at least one measure. Thus, the measures in the results for the query can be leveraged to effectively determine the number of spatial points encompassed by a shape without having to actually query for the number of spatial points encompassed by the shape. Convention methods that query for the number of spatial points encompassed by a shape perform noticeably slower.

In some embodiments, spatial data may be data that defines the shape, size, position, and/or orientation of a geometry (e.g., a point, a line, an area, a region, or any combination thereof) in a defined space (e.g., the surface of the Earth). In some embodiments, a defined space in which geometries are defined is referred to as a spatial reference system (SRS). A particular defined space may be associated with a unique identifier referred to as a spatial reference identifier (SRID). Spatial data may be represented using a particular spatial data type (e.g., a point represented as an ST_point, a line represented as an ST_curve, an area represented as an ST_polygon, etc.). Spatial operations may be performed on spatial data such as calculating the intersection of spatial data (e.g., intersection of two polygons), determining whether spatial data (e.g., a point, a line, a polygon, or any combination therefore) is contained within another spatial data (e.g., a polygon), etc.

FIG. 1 illustrates a system 100 according to some embodiments. The system can provide geographical regions of geographical hierarchies. In addition, the system may provide a feature for focusing on geographical regions of geographical hierarchies. As shown, system 100 includes client device 105, computing system 110, computing system 125, and geometry data sources 145a-145n. Although FIG. 1 shows one client device 105, one of ordinary skill in the art will appreciate that any number of additional client devices configured similarly to client device 105 may be included in system 100. While FIG. 1 shows computing system 110, computing system 125, and geometry data sources 145a-n as separate, one of ordinary skill in the art will understand that they can be implemented in any number of different ways. For instance, in some embodiments, the components in computing system 110 and computing system 125 may be implemented in a single computing system. In some embodiments, one or more of geometry data sources 145a-n can be implemented as part of computing system 110 and/or computing system 125.

Geometry data sources 145a-145n are each configured to stores set of geometry data. In some embodiments, geometry data may include spatial data describing geometries that represent geographical regions. In some cases, geometry data sources 145a-n can each be implemented on a different system, database, or a combination thereof. In other cases, some or all geometry data sources 145a-n can be implemented on the same system or in the same database (e.g., each geometry data source 145 may be implemented as a different set of tables in the database).

Client device 105 is configured to communicate and interact with computer system 110. For example, a user of client device 105 may send computing system 110 input specifying a dataset to use for visualizing data on a map. In some embodiments, a dataset includes a set of records. Each record in the dataset can include location fields among other fields (e.g., measures, dimensions, etc.). A location field may store spatial data (e.g., a point, a line, a curve, a polygon, a surface, a multipolygon, a combination thereof, etc.). After specifying a dataset, the user of the client device 105 can send computing system 110 input specify a location field of the dataset that stores spatial points. In return, client device 105 receives a set of geographical hierarchies from computing system 110. In some embodiments, client device 105 also receives a view of a map that includes geometries of geographical regions belonging to a level (e.g., the top-most level) in a defined default geographical hierarchy in the set of geographical hierarchies. In other embodiments, the user of client device 105 may select one of the geographical hierarchies from the set of geographical hierarchies. In response, client device 105 may receive a view of a map that includes geometries of geographical regions belonging to a level (e.g., the top-most level) in the selected geographical hierarchy. In either such embodiments, the geometries included in the view of the map are geometries that intersect with at least one spatial point in the dataset. Client device 105 can display the view of the map on a display of client device 105.

After receiving a view of a map with geometries of geographical regions belonging to a level in a geographical hierarchy, the user of client device 105 may perform a variety of other operations. For instance, the user of client device 105 can send application 115 a selection of a different level in the selected geographical hierarchy. In response to the selection, client device 105 may receive a view of a map that includes geometries of geographical regions belonging to the selected level in the geographical hierarchy and then display the view of the map. The geometries included in this view of the map are geometries that intersect with at least one spatial point in the dataset. As another example, the user of client device 105 may send application 115 a selection of a different geographical hierarchy from the set of geographical hierarchies received from computing system 110. In response to the selection, client device 105 can receive a view of a map that includes geometries of geographical regions belonging to a level (e.g., the top-most level) in the newly selected geographical hierarchy and display the view of the map on a display of client device 105. The geometries included in the view of the map are geometries that intersect with at least one spatial point in the dataset.

In some instances, the user of client device 105 may send a request to focus on a particular geographical region (e.g., by invoking a context menu or drop-down menu that contains an option for focusing on the particular geographical region and selecting it) in a view of a map. In some cases, client device 105 receives, in response to the selection of the option, a view of a map that includes spatial points in the dataset that intersect with the particular geographical region. In other cases, client device 105 receives, in response to the selection of the option, a view of a map that includes geometries of geographical subregions of the particular geographical region. The geometries of the geographical subregions belong to a level in a geographical hierarchy lower than the level of the particular geographical region. The geometries of the geographical subregions included in the view of the map are geometries that intersect with at least one spatial point in the dataset.

In yet some other cases, client device 105 can receive a notification indicating that the particular geographical region has missing geographical subregions. The notification additionally prompts for input as to whether to provide a view of a map with missing geographical subregions or to provide the view of the map with spatial points in the dataset. If the user of the client device 105 provides input indicating to provide a view of a map with missing geographical subregions, client device 105 receives from application 115 a view of a map that includes geometries of geographical subregions of the particular geographical region. If the user of the client device 105 provides input indicating to provide a view of a map that includes spatial points in the dataset, client device 105 receives a view of a map that includes spatial points in the dataset that intersect with the particular geographical region.

As illustrated in FIG. 1, computing system 110 includes application 115 and data manager 120. Application 115 may be any number of different types of applications. For instance, application 115 may be an analytics application, a data management application, a database management application, a human capital management application, an enterprise management application, a customer relationship management application, a financial management application, etc.

Application 115 communicates and interacts with client device 105. For example, application 115 may receive from client device 105 input specifying a dataset to use for visualizing data on a map and a location field of the dataset that stores spatial points. In response to receiving input specifying the location field of the dataset, application 115 sends data manager 120 a request for geographical hierarchies as well as geometries that represent geographical regions belonging to a level in one of the geographical hierarchies and intersect with at least one spatial point in the dataset. In return, application 115 receives from data manager 120 a set of geographical hierarchy definitions. In some embodiments, a geographical hierarchy definition specifies a unique ID associated with a geographical hierarchy, a name of the geographical hierarchy, a number of levels in the geographical hierarchy, a name for each level in the geographical hierarchy, and a data source (e.g., a geometry data source 145) for each level in the geographical hierarchy. In addition, application 115 receives from data manager 120 the requested geometries. Application 115 then generates a view of the map that includes the geometries and provides it to client device 105. In some embodiments, application 115 generates the view of the map with the geometries by retrieving map data (e.g., raster tiles, vector base maps, etc.) for the view of the map from another computing system (e.g., a third party system that provides map data), rendering the view of the map based on the map data, and rendering the geometries in the view of the map.

Once application 115 provides the view of the map to client device 105, application 115 may receive several different operations from client device 105. For example, application 115 can receive a selection of a different level in the current geographical hierarchy. In response, application 115 sends data manager 120 a request for geometries that represent geographical regions belonging to the selected level in the current geographical hierarchy and intersect with at least one spatial point in the dataset. Application 115 receives the requested geometries from data manager 120 and generates a view of a map that includes the geometries in the manner described above. As another example, application 115 may receive a selection of a different geographical hierarchy. In response, application 115 sends data manager 120 a request for geometries that represent geographical regions belonging to a level in the selected geographical hierarchy and intersect with at least one spatial point in the dataset. When application 115 receives the requested geometries from data manager 120, application 115 generates a view of a map that includes the geometries in the manner described above.

In some cases, application 115 can receive from client device 105 a request to focus on a particular geographical region in a view of a map that intersects with at least one spatial point in a dataset. In response, application 115 sends data manager 120 the request to process. Application 115 may receive a number of different responses from data manager 120. In some instances, application 115 may receive from data manager 120 geometries of geographical subregions of the particular geographical region that intersect with at least one spatial point in the dataset. In response, application 115 generates a view of a map with the geometries of geographical subregions of the particular geographical region in the manner described above.

In other instances, application 115 can receive from data manager 120 spatial points that intersect with the particular geographical region. In response, application 115 generates a view of a map that includes the spatial points. In some embodiments, application 115 generates the view of the map with the spatial points by retrieving map data (e.g., raster tiles, vector base maps, etc.) for the view of the map from another computing system (e.g., a third party system that provides map data), rendering the view of the map based on the map data, and rendering the spatial points in the view of the map.

In yet other instances, application 115 can receive a message from data manager 120 indicating that the particular geographical region has missing geographical subregions. In response to the message, application 115 provides client device 105 a notification indicating that the particular geographical region has missing geographical subregions. The notification also includes a prompt for input as to whether to provide a view of a map with missing geographical subregions or to provide the view of the map with spatial points in the dataset. If application 115 receives an indication from client device 105 to provide the view of the map with missing geographical subregions, application 115 forwards it to data manager 120. In response, application 115 receives geometries representing geographical subregions of the particular geographical region that intersect spatial points in the dataset. Then, application 115 generates a view of a map with the geometries of geographical subregions of the particular geographical region in the manner described above. If application 115 receives an indication from client device 105 to provide the view of the map with spatial points in the dataset, application 115 forwards it to data manager 120. In return, application 115 receives from data manager 120 spatial points in the dataset that intersect with the particular geographical region. When application 115 receives the spatial points, application 115 generates a view of a map that includes the spatial points in the manner described above.

Data manager 120 is configured to manage data for application 115. For instance, data manager 120 can receive from application 115 a request for geographical hierarchies and geometries that represent geographical regions belonging to a level in one of the geographical hierarchies and intersect with at least one spatial point in a dataset. In response, data manager 120 send computing system 125 a query for geographical hierarchies. In return, data manager 120 receives from computing system 125 data describing geographical hierarchies. Based on this data, data manager 120 generates a geographical hierarchy definition for each described geographical hierarchy. As explained above, in some embodiments, a geographical hierarchy definition specifies a unique ID associated with a geographical hierarchy, a name of the geographical hierarchy, a number of levels in the geographical hierarchy, a name for each level in the geographical hierarchy, and a data source (e.g., a geometry data source 145) for each level in the geographical hierarchy. Data manager 120 stores the set of geographical hierarchy definitions (e.g., in a local storage) and sends the set of geographical hierarchy definitions to application 115.

Next, data manager 120 selects a geographical hierarchy defined by one of the geographical hierarchy definitions in the set of geographical hierarchy definitions. In some embodiments, one of the geographical hierarchies defined by a geographical hierarchy definition in the set of geographical hierarchy definitions is specified as a default geographical hierarchy. In some such embodiments, data manager 120 selects the default geographical hierarchy. Data manager 120 also selects a level in the selected geographical hierarchy. In some embodiments, data manager 120 selects the top-most level in the selected geographical hierarchy. Then, data manager 120 retrieves, from the geometry data source 145 specified for the selected level in the geographical hierarchy, geometries representing geographical regions belonging to the selected level in the geographical hierarchy. In some embodiments, data manager 120 retrieves such geometries by generating a query for geometries from the geometry data source 145 specified for the selected level in the geographical hierarchy that represent geographical regions belonging to the selected level in the geographical hierarchy and intersect with at least one spatial point in the dataset. Then, data manager 120 sends the query to computing system 125 for processing. Data manager 120 receives from computing system 125 geometries that represent geographical regions belonging to the selected level in the selected geographical hierarchy and intersect with at least one spatial point in the dataset, which data manager 120 sends to application 115.

In some instances, data manager 120 may receive from application 115 a request for geometries that represent geographical regions belonging to a particular level in a geographical hierarchy (e.g., a level selected by client device 105 for a geographical hierarchy) and intersect with at least one spatial point in a dataset. In response to such a request, data manager 120 retrieves, from the geometry data source 145 specified for the particular level in the geographical hierarchy, geometries representing geographical regions belonging to the particular level in the geographical hierarchy. Data manager 120 can retrieve such geometries by generating a query for geometries from the geometry data source 145 specified for the particular level in the geographical hierarchy that represent geographical regions belonging to the particular level in the geographical hierarchy and intersect with at least one spatial point in the dataset. Data manager 120 sends the query to computing system 125 for processing. In return, data manager 120 may receive from computing system 125 geometries that represent geographical regions belonging to the particular level in the geographical hierarchy and intersect with at least one spatial point in the dataset. Data manager 120 then sends the geometries to application 115.

In other instances, data manager 120 may receive from application 115 a request for geometries that represent geographical regions belonging to a level in a particular geographical hierarchy (e.g., a geographical hierarchy selected by client device 105) and intersect with at least one spatial point in a dataset. In response, data manager 120 selects a level in the particular geographical hierarchy. In some embodiments, data manager 120 selects the top-most level in the particular geographical hierarchy. Next, data manager 120 retrieves, from the geometry data source 145 specified for the selected level in the particular geographical hierarchy, geometries representing geographical regions belonging to the selected level in the particular geographical hierarchy. Data manager 120 may retrieve such geometries by generating a query for geometries from the geometry data source 145 specified for the selected level in the particular geographical hierarchy that represent geographical regions belonging to the selected level in the particular geographical hierarchy and intersect with at least one spatial point in the dataset. Data manager 120 sends the query to computing system 125 for processing. In return, data manager 120 may receive from computing system 125 geometries that represent geographical regions belonging to the particular level in the geographical hierarchy and intersect with at least one spatial point in the dataset. Data manager 120 sends the geometries to application 115.

In some cases, data manager 120 can receive from application 115 a request to focus on a particular geographical region in a view of a map that intersects with at least one spatial point in a dataset. Data manager 120 processes the request by identifying a level in a geographical hierarchy to which the particular geographical region belongs and determining whether to transition to a level in the identified geographical hierarchy lower than the level in the geographical hierarchy to which the particular geographical region belongs. If data manager 120 determines to transition to a lower level in the identified geographical hierarchy, data manager 120 retrieves, from the geometry data source 145 specified for the lower level in the geographical hierarchy, geometries representing geographical subregions of the particular geographical region that belong to the lower level in the geographical hierarchy and intersect with at least one spatial point in the dataset. In some embodiments, data manager 120 retrieves the geometries by generating a query for geometries from the geometry data source 145 specified for the lower level in the geographical hierarchy representing geographical subregions of the particular geographical region that belong to the lower level in the geographical hierarchy and intersect with at least one spatial point in the dataset. Next, data manager 120 sends the query to computing system 125 for processing. Upon receiving the requested geometries from computing system 125, data manager 120 sends them to application 115.

On the other hand, if data manager 120 determines to not transition to a lower level in the identified geographical hierarchy, data manager 120 retrieves spatial points in the dataset that intersect with the particular geographical region. In some embodiments, data manager 120 retrieves the spatial points by generating a query for spatial points in the dataset that intersect with the particular geographical region and sending it to computing system 125 for processing. Once data manager 120 receives the spatial points, data manager 120 sends them to application 115.

In some instances, data manager 120 determines that the particular geographical region has missing geographical subregions. In such instances, data manager 120 sends application 115 a message indicating that the particular geographical region has missing geographical subregions. If data manager 120 receives from application 115 an indication to provide a view of a map with missing geographical subregions, data manager 120 retrieves, from the geometry data source 145 specified for the lower level in the geographical hierarchy, geometries representing geographical subregions of the particular geographical region that belong to the lower level in the geographical hierarchy and intersect with at least one spatial point in the dataset in the manner described above. If data manager 120 receives from application 115 an indication to provide a view of a map with spatial points in a dataset, data manager 120 retrieves spatial points in the dataset that intersect with the particular geographical region in the manner described above.

As shown in FIG. 1, computing system 125 includes query processor 130, hierarchy data storage 135 and dataset data storage 140. In some embodiments, a database management system (DBMS) provides access to and interacts with hierarchy data storage 135 and/or dataset data storage 140. In some such embodiments, query processor 130 is implemented as part of the DBMS. Hierarchy data storage 135 is configured to store geographical hierarchy definitions. As described above, a geographical hierarchy definition specifies a unique ID associated with a geographical hierarchy, a name of the geographical hierarchy, a number of levels in the geographical hierarchy, a name for each level in the geographical hierarchy, and a data source (e.g., a geometry data source 145) for each level in the geographical hierarchy in some embodiments. Dataset data storage 140 is configured to store datasets. As mentioned above, in some embodiments, a dataset includes a set of records, where each record in the dataset can include location fields among other fields (e.g., measures, dimensions, etc.) and where a location field may store spatial data (e.g., a point, a line, a curve, a polygon, a surface, a multipolygon, a combination thereof, etc.). In some embodiments, storages 135 and 140 are implemented in a single physical storage while, in other embodiments, storages 135 and database 140 may be implemented across several physical storages. While FIG. 1 shows storages 135 and 140 as part of computing system 125, one of ordinary skill in the art will appreciate that storage 135 and/or storage 140 may be external to computing system 125 in some embodiments.

Query processor 130 handles queries for various different data. For example, query processor 130 can receive from data manager 120 a query for geographical hierarchies. In response, query processor 130 accesses hierarchy data storage 135 and retrieves the geographical hierarchy definitions defining geographical hierarchies stored in hierarchy data storage 135. As another example, query processor 130 may receive from data manager 120 a query for geometries from a geometry data source 145 that intersect with at least one spatial point in a dataset. Query processor 130 processes the query by retrieving the dataset from dataset data storage 140, retrieving geometries from the geometry data source 145, and performing spatial operations (e.g., an intersection operation) on the spatial points in the dataset and the retrieved geometries to identify geometries in the retrieved geometries that intersect with at least one spatial point in the dataset. Query processor 130 sends the identified geometries to data manager 120.

In some case, query processor 130 receives from data manager 120 a query for geometries from a geometry data source 145 that are encompassed by a particular geometry and that intersect with at least one spatial point in a dataset. To process such a query, query processor 130 retrieves the dataset from dataset data storage 140, retrieves geometries from the geometry data source 145, and performs spatial operations (e.g., an intersection operation) on the spatial points in the dataset, the retrieved geometries, and the particular geometry to identify geometries in the retrieved geometries that are encompassed by the particular geometry and that intersect with at least one spatial point in the dataset. Then, query processor 130 sends the identified geometries to data manager 120.

In other cases, query processor 130 receives from data manager 120 a query for spatial points in a dataset that intersect with a particular geometry. Query processor 130 processes such a query by retrieving the dataset from dataset data storage 140 and performing spatial operations (e.g., an intersection operation) on the spatial points in the dataset and the particular geometry to identify spatial points in the dataset that intersect with the particular geometry. Query processor 130 sends the identified spatial points to data manager 120.

An example operation of the system 100 will now be described by reference to FIGS. 1-6. FIG. 2 illustrates an example table 200 defining geographical hierarchies according to some embodiments. Specifically, table 200 will be used as the data stored in hierarchy data storage 135 for this example. As shown, table 200 includes nine records of data 233-248. Each of the records 232-248 is divided into fields 205-230. In this example, field 205 is configured to store a unique identifier (ID) for a record. Field 210 is configured to store a name of a geographical hierarchy. Field 215 is configured to store a unique identifier of a geographical hierarchy. Field 220 is configured to store a level of a geographical hierarchy and field 225 is configured to store a name of the level of the geographical hierarchy. Field 230 is configured to store a data source of geometry data describing geometries representing geographical regions in a level of a geographical hierarchy.

FIG. 3 illustrates an example table 300 of geometry data for a level of a geographical hierarchy defined in the table illustrated in FIG. 2 according to some embodiments. For this example, table 300 stores geometry data describing geometries representing countries. In addition, table 300 is stored in geometry data source 145a. Field 230 of records 232 and 240 in table 200 each points to table 300 (not shown). As such, table 300 stores geometry data for the first level in a geographical hierarchy with a unique ID of "1" and a name of "Geographical Regions." As shown, table 300 include n records that are divided into fields 305-315. Field 305 is configured to store a spatial data (e.g., a polygon, a multipolygon, etc.) describing a geometry representing a geographical region. Field 310 is configured to store a unique identifier of a geometry. Field 315 is configured to store a name of a geographical region represented by a geometry.

FIG. 4 illustrates an example table 400 of geometry data for a level of a geographical hierarchy defined in the table illustrated in FIG. 2 according to some embodiments. In this example, table 400 stores geometry data describing geometries representing states in the country of the United States. Further, table 400 is stored in geometry data source 145a and field 230 of record 234 in table 200 points to table 400 (not shown). Thus, table 400 stores geometry data for the second level in a geographical hierarchy with a unique ID of "1" and a name of "Geographical Regions." As shown, table 400 include 50 records that are divided into fields 405-415. Field 405 is configured to store a spatial data (e.g., a polygon, a multipolygon, etc.) describing a geometry representing a geographical region. Field 410 is configured to store a unique identifier of a geometry. Field 415 is configured to store a name of a geographical region represented by a geometry.

FIG. 5 illustrates an example table 500 of geometry data for a level of a geographical hierarchy defined in the table illustrated in FIG. 2 according to some embodiments. For this example, table 500 stores geometry data describing geometries representing sales regions. In addition, table 500 is stored in geometry data source 145d and field 230 of record 242 in table 200 points to table 500 (not shown). As such, table 500 stores geometry data for the second level in a geographical hierarchy with a unique ID of "2" and a name of "Sales Region." As shown, table 500 include three records that are divided into fields 505-515. Field 505 is configured to store a spatial data (e.g., a polygon, a multipolygon, etc.) describing a geometry representing a geographical region. Field 510 is configured to store a unique identifier of a geometry. Field 515 is configured to store a name of a geographical region represented by a geometry.

For the purposes of explanation and illustration, FIGS. 3-5 illustrate several tables of geometry data that are used in this example for different levels in the geographical hierarchies defined in table 200. Tables of geometry data used other levels in the geographical hierarchies defined in table 200 are not show. However, one of ordinary skill in the art will understand how similarly structured tables can store appropriate data for the other levels in the geographical hierarchies defined in table 200.

Figure 6A:
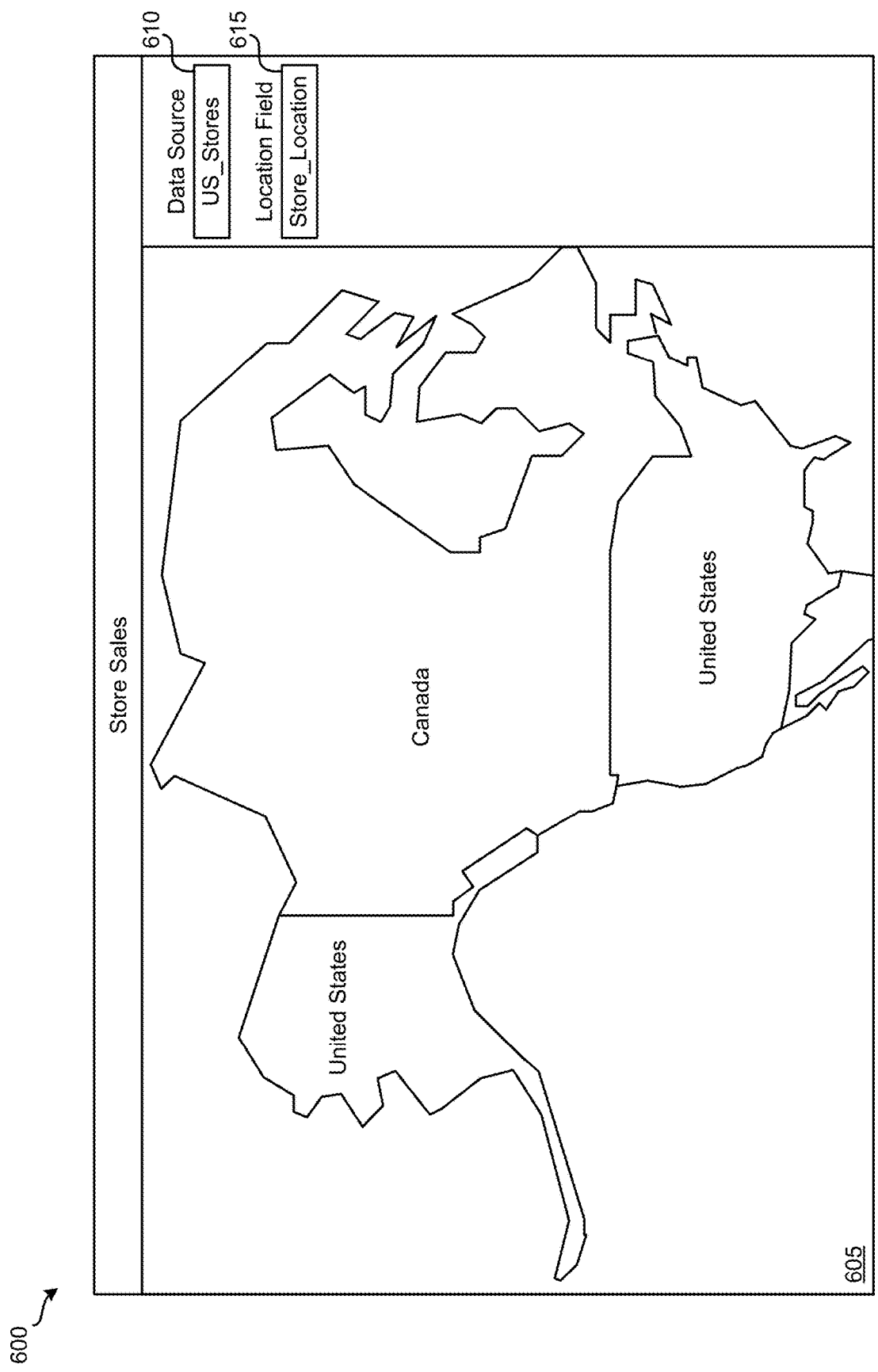
FIGS. 6A-6E illustrate a graphical user interface for providing geographical regions of geographical hierarchies according to some embodiments.

The example operation starts by a user of client device 105 interacting with application 115 and sending application 115 input specifying a dataset to use for visualizing data on a map. Next, the user of client device 115 sends application 115 input specify a location field of the dataset that stores spatial points. FIG. 6A illustrates a GUI 600 for providing geographical regions of geographical hierarchies according to some embodiments. Specifically, GUI 600 is being presented in a display of client device 105. GUI 600 includes a view of a map 605 and user interface (UI) controls 610 and 615. As shown, the view of the map 605 mainly depicts the countries of Canada and the United States. UI control 610 is configured for specifying a dataset. In this example, a user of client device 105 specified a dataset that includes store sales data of stores located in the United States. UI control 615 is configured for specifying a location field in a dataset. For this example, the user of client device 105 specified a location field in the dataset that stores spatial points representing locations of stores.

Returning to FIG. 1 and continuing with the example, in response to receiving the input specifying the location field of the dataset, application 115 sends data manager 120 a request for geographical hierarchies along with geometries that represent geographical regions belonging to a level in one of the geographical hierarchies and intersect with at least one spatial point in the dataset. When data manager 120 receives the request from application 115, data manager 120 sends query processor 130 a query for geographical hierarchies.

Query processor 130 processes the query by accessing hierarchy data storage 135, retrieving all the records (i.e., records 232-248) from table 200, and sending the records to data manager 120. Upon receiving the records from query processor 130, data manager 120 generates a geographical hierarchy definition for each geographical hierarchy described in the records. As described above, in some embodiments, a geographical hierarchy definition specifies a unique ID associated with a geographical hierarchy, a name of the geographical hierarchy, a number of levels in the geographical hierarchy, a name for each level in the geographical hierarchy, and a data source (e.g., a geometry data source 145) for each level in the geographical hierarchy. Data manager 120 stores the set of geographical hierarchy definitions (e.g., in a local storage) and sends the set of geographical hierarchy definitions to application 115. In this example, data manager 120 generates three geographical hierarchy definitions based on records 232-248.

A first geographical hierarchy definition specifies "1" as the unique ID associated with a geographical hierarchy; "Geographical Regions" as the name of the geographical hierarchy, and four levels in the geographical hierarchy. A "Country" level is the first level with geometry data source 145a (table 300 in this example) as the data source of geometry data. A "Region" level is the second level with geometry data source 145a (table 400 in this example) as the data source of geometry data. A "Subregion 1" level is the third level with geometry data source 145a as the data source of geometry data. A "Subregion 2" level is the fourth level with geometry data source 145a as the data source of geometry data. A second geographical hierarchy definition specifies "2" as the unique ID associated with a geographical hierarchy; "Sales Regions" as the name of the geographical hierarchy, and three levels in the geographical hierarchy. A "Country" level is the first level with geometry data source 145a (table 300 in this example) as the data source of geometry data. A "Sales Region" level is the second level with geometry data source 145d (table 500 in this example) as the data source of geometry data. A "Sales Subregion" level is the third level with geometry data source 145d as the data source of geometry data. A third geographical hierarchy definition specifies "3" as the unique ID associated with a geographical hierarchy; "Marketing Regions" as the name of the geographical hierarchy, and two levels in the geographical hierarchy. A "Marketing Region" level is the first level with geometry data source 145c as the data source of geometry data. A "Marketing Subregion" level is the second level with geometry data source 145b as the data source of geometry data.

Then, data manager 120 selects a geographical hierarchy defined by one of the three geographical hierarchy definitions. For this example, the "Geographical Regions" geographical hierarchy is specified as a default geographical hierarchy so data manager 120 selects it as the geographical hierarchy to start with. Data manager 120 selects the topmost level in the "Geographical Regions" geographical hierarchy as the level to start with. Next, data manager 120 retrieves, from table 300 in geometry data source 145a, geometries representing geographical regions. For this example, data manager 120 retrieves the geometries stored in table 300 by generating a query for geometries from table 300 that intersect with at least one spatial point in the dataset and sending the query to query processor 130 for processing.

When query processor 130 receives the query from data manager 120, query processor 130 retrieves the dataset from dataset data storage 140, retrieves geometries from table 300 of geometry data source 145a, and performs an intersection operation on the spatial points in the dataset and the geometries from table 300 to identify geometries in table 300 that intersect with at least one spatial point in the dataset. Then, query processor 130 sends the identified geometries to data manager 120, which forwards them to application 115.

Once application 115 receives from data manager 120 the three geographical hierarchy definitions and the geometries representing geographical regions belonging to the "Country" level in the "Geographical Regions" geographical hierarchy and intersect with at least one spatial point in the dataset, application 115 generates a view of a map that includes the geometries. For this example, application 115 generates the view of the map with the geometries by retrieving map data (e.g., raster tiles, vector base maps, etc.) for the view of the map from another computing system (e.g., a third party system that provides map data), rendering the view of the map based on the map data, and rendering the geometries in the view of the map. Application 115 then provides the view of the map with the geometries and the three geographical hierarchies to client device 105, which client device 105 displays on a display of the client device 105.

Figure 6B:
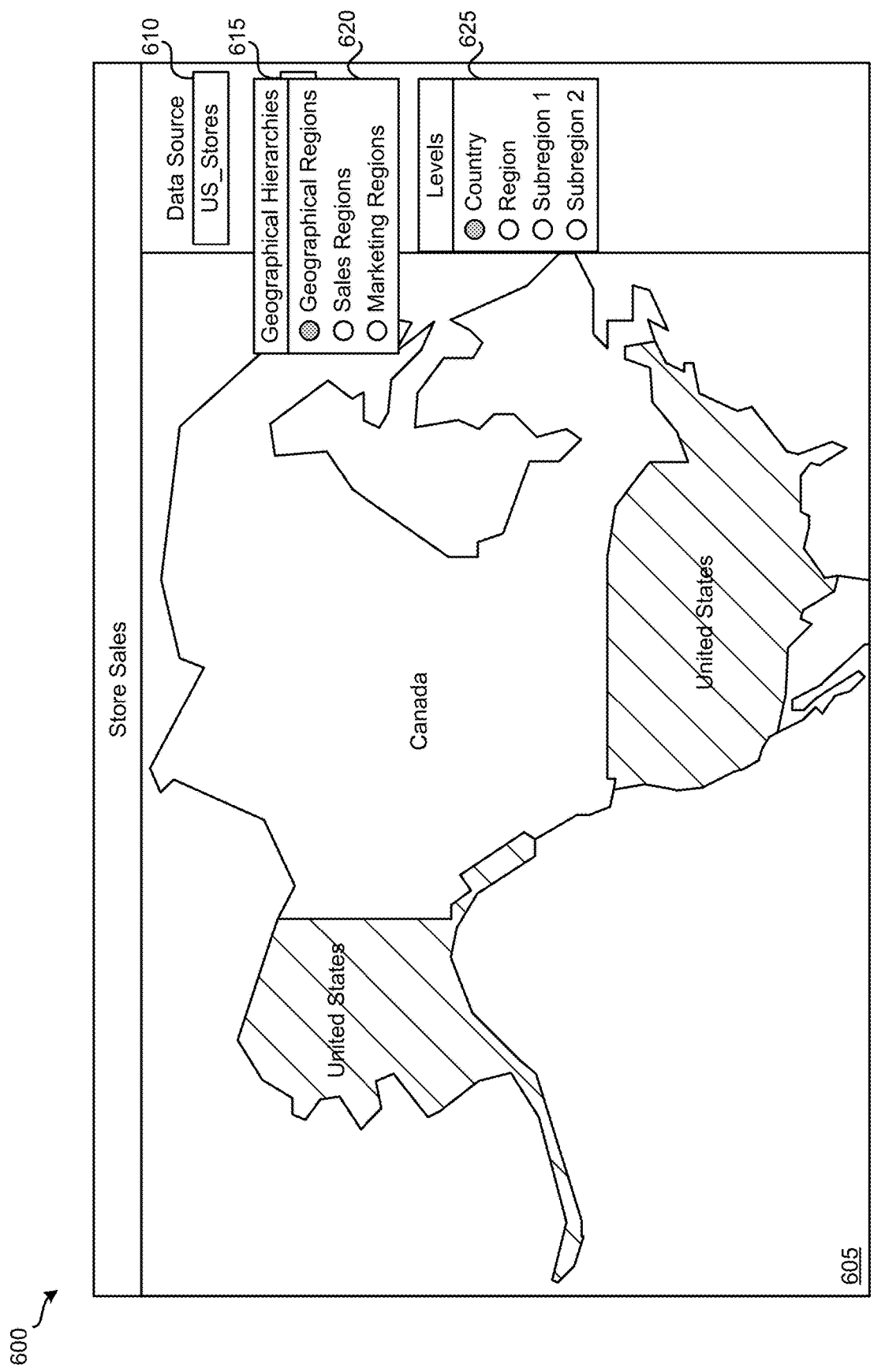

FIG. 6B illustrates GUI 600 after client device 105 displays on a display of the client device 105 the view of the map that includes the geometries representing geographical regions belonging to the "Country" level in the "Geographical Regions" geographical hierarchy and intersect with at least one spatial point in the dataset. In this example, only the geometry representing the country of the United States intersects with the store locations in the dataset As shown, the view of the map 605 shows a geometry (a multipolygon in this example), indicated by a shape covered with diagonal lines, representing the country of the United States rendered over the view of the map 605. Additionally, GUI 600 includes UI controls 620 and 625. UI control 620 is configured to present the geographical hierarchies available to use to view data in the dataset. UI control 625 is configured to present levels in a selected geographical hierarchy available to use to view data in the dataset. As illustrated, the "Geographical Regions" option is selected in UI control 20 and the "Country" level is selected in UI control 625 since the view of the map 605 includes geometries representing geographical regions belonging to the "Country" level in the "Geographical Regions" geographical hierarchy.

Returning to FIG. 1 and continuing with the example, the user of client device 105 proceeds to select a different level in the selected geographical hierarchy illustrated in FIG. 6B. In this example, the user of client device 105 sends application 115 a selection the "Region" level of the "Geographical Regions" geographical hierarchy. In response to the selection, application 115 sends data manager 120 a request for geometries that represent geographical regions belonging to the "Region" level in the "Geographical Regions" geographical hierarchy and intersect with at least one spatial point in the dataset.

Upon receiving the request, data manager 120 retrieves, from table 400 in geometry data source 145a, as specified in the geographical hierarchy definition for the "Geographical Regions" geographical hierarchy, geometries representing geographical regions belonging to the "Region" level in the "Geographical Regions" geographical hierarchy. In this example, data manager 120 retrieves the geometries by generating a query for geometries from table 400 that intersect with at least one spatial point in the dataset. Data manager 120 then sends the query to query processor 130 for processing. Query processor 130 processes the query by retrieving the dataset from dataset data storage 140, retrieving geometries from table 400 of geometry data source 145*a*, and performing an intersection operation on the spatial points in the dataset and the geometries from table 400 to identify geometries in table 400 that intersect with at least one spatial point in the dataset. Query processor 130 sends the identified geometries to data manager 120. Next, data manager 120 sends the geometries to application 115. In response, application 115 generates a view of a map that includes the geometries in the manner described above and provides the view of the map to client device 105. Then, client device 105 displays the view of the map on the display of the client device 105.

Figure 6C:
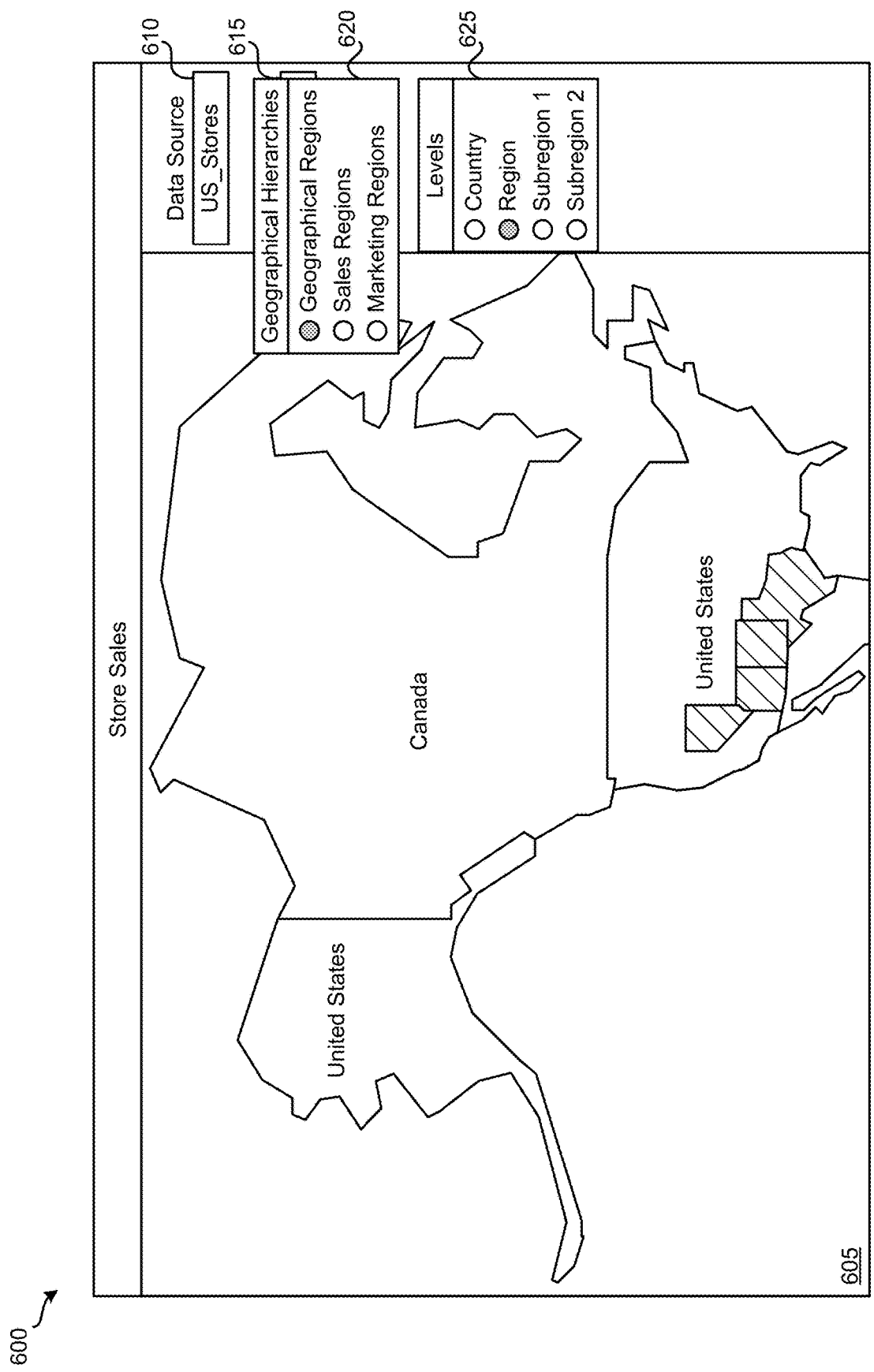

FIG. 6C illustrates GUI 600 after client device 105 displays on a display of the client device 105 the view of the map that includes the geometries representing geographical regions belonging to the "Region" level in the "Geographical Regions" geographical hierarchy and intersect with at least one spatial point in the dataset. For this example, the geometries representing the states of Nevada, Arizona, New Mexica, and Texas intersect with the store locations in the dataset. As illustrated, the view of the map 605 shows geometries, indicated by shapes covered with diagonal lines, representing the states of Nevada, Arizona, New Mexica, and Texas rendered over the view of the map 605. GUI 600 of FIG. 6C also shows the "Geographical Regions" option is selected in UI control 20 and the "Region" level is selected in UI control 625 as the view of the map 605 includes geometries representing geographical regions belonging to the "Region" level in the "Geographical Regions" geographical hierarchy.

Referring back to FIG. 1 and continuing with the example, the user of client device 105 next selects a different geographical hierarchy for viewing data in the dataset. For this example, the user of client device 105 sends application 115 a selection the "Sales Regions" geographical hierarchy. In response to the selection, application 115 sends data manager 120 a request for geometries that represent geographical regions belonging to a level in the "Sales Regions" geographical hierarchy and intersect with at least one spatial point in the dataset.

In response, data manager 120 selects the top-most level in the "Sales Regions" geographical hierarchy. Then, data manager 120 retrieves, from table 300 in geometry data source 145*a*, geometries representing geographical regions by generating a query for geometries from table 300 that intersect with at least one spatial point in the dataset and sending the query to query processor 130 for processing. Query processor 130 processes the query by retrieving the dataset from dataset data storage 140, retrieving geometries from table 300 of geometry data source 145*a*, and performing an intersection operation on the spatial points in the dataset and the geometries from table 300 to identify geometries in table 300 that intersect with at least one spatial point in the dataset. Then, query processor 130 sends the identified geometries to data manager 120, which forwards them to application 115. When application receives the geometries, application 115 generates a view of a map that includes the geometries in the manner described above and provides the view of the map to client device 105, which then displays the view of the map on the display of the client device 105.

Figure 6D:
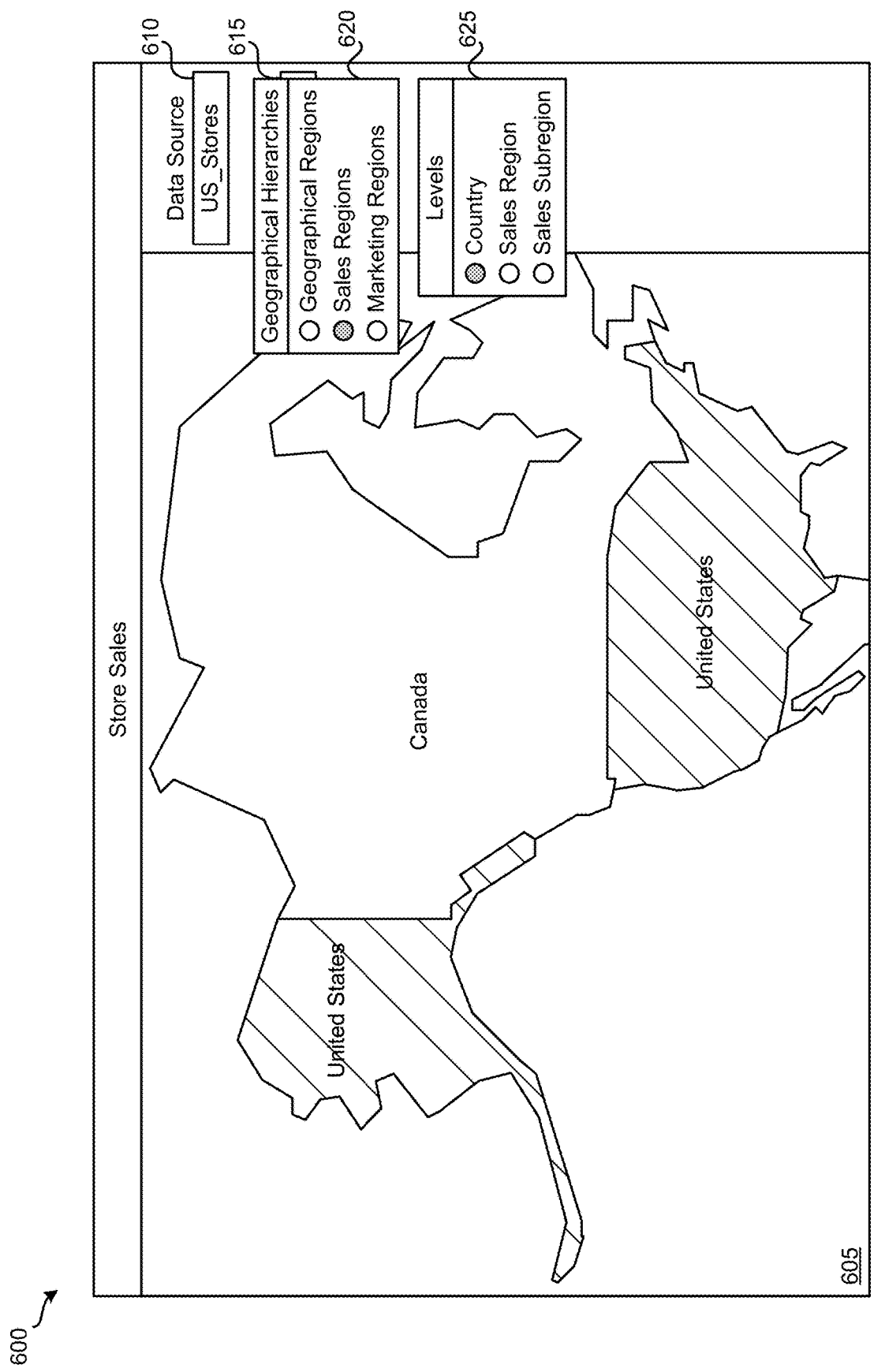

FIG. 6D illustrates GUI 600 after client device 105 displays on a display of the client device 105 the view of the map that includes the geometries representing geographical regions belonging to the "Country" level in the "Sales Regions" geographical hierarchy and intersect with at least one spatial point in the dataset. Because the "Sales Regions" geographical hierarchy has the same top level as the "Geographical Regions" geographical hierarchy, GUI 600 of FIG. 6D shows the same view of the map 605 as GUI 600 of FIG. 6B. In GUI 600 of 6G, however, the "Sales Regions" option is selected in UI control 20 and the "Country" level is selected in UI control 625 accordingly.

Returning to FIG. 1 and continuing with the example, the user of client device 105 proceeds to select a different level in the selected geographical hierarchy illustrated in FIG. 6D. In this example, the user of client device 105 sends application 115 a selection the "Sales Region" level of the "Sales Regions" geographical hierarchy. In response to the selection, application 115 sends data manager 120 a request for geometries that represent geographical regions belonging to the "Sales Region" level in the "Sales Regions" geographical hierarchy and intersect with at least one spatial point in the dataset.

When data manager 120 receives the request, data manager 120 retrieves, from table 500 in geometry data source 145*d*, as specified in the geographical hierarchy definition for the "Sales Regions" geographical hierarchy, geometries representing geographical regions belonging to the "Sales Region" level in the "Sales Regions" geographical hierarchy. For this example, data manager 120 retrieves the geometries by generating a query for geometries from table 500 that intersect with at least one spatial point in the dataset. Next, data manager 120 sends the query to query processor 130 for processing. Upon receiving the query, query processor 130 processes it by retrieving the dataset from dataset data storage 140, retrieving geometries from table 500 of geometry data source 145*d*, and performing an intersection operation on the spatial points in the dataset and the geometries from table 500 to identify geometries in table 500 that intersect with at least one spatial point in the dataset. Then, query processor 130 sends the identified geometries to data manager 120 and data manager 120 sends them to application 115. After receiving the geometries, application 115 generates a view of a map that includes the geometries in the manner described above and provides the view of the map to client device 105. Client device 105 then displays the view of the map on the display of the client device 105.

Figure 6E:
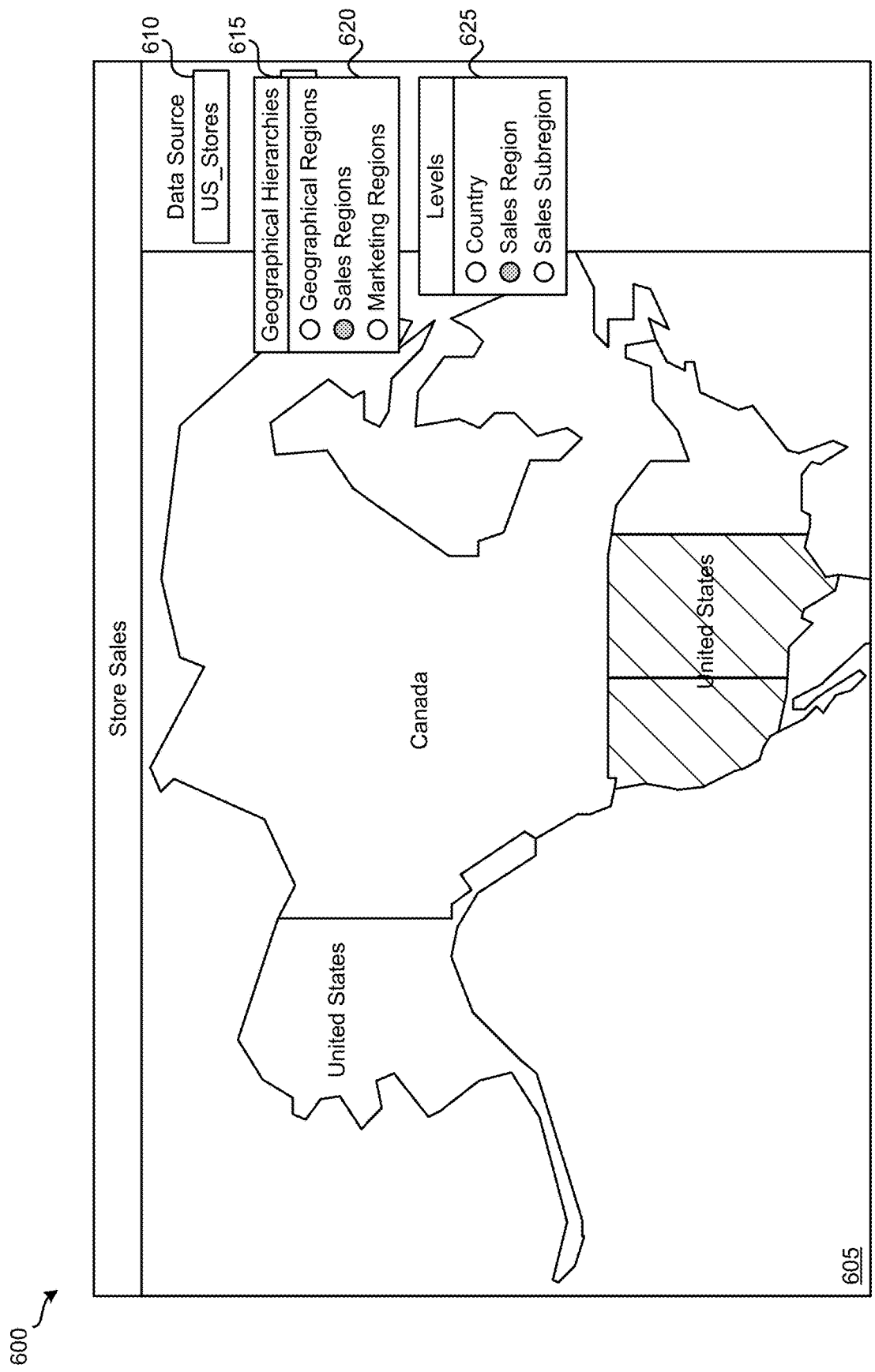

FIG. 6E illustrates GUI 600 after client device 105 displays on a display of the client device 105 the view of the map that includes the geometries representing geographical regions belonging to the "Sales Region" level in the "Sales Regions" geographical hierarchy and intersect with at least one spatial point in the dataset. In this example, the geometries representing a West region and a Central region intersect with the store locations in the dataset. As shown, the view of the map 605 shows geometries, indicated by shapes covered with diagonal lines, representing the West region and the Central region rendered over the view of the map 605. Also, FIG. 6E shows the "Sales Regions" option is selected in UI control 20 and the "Sales Region" level is selected in UI control 625 as the view of the map 605 includes geometries representing geographical regions belonging to the "Region" level in the "Geographical Regions" geographical hierarchy.

Figure 7:
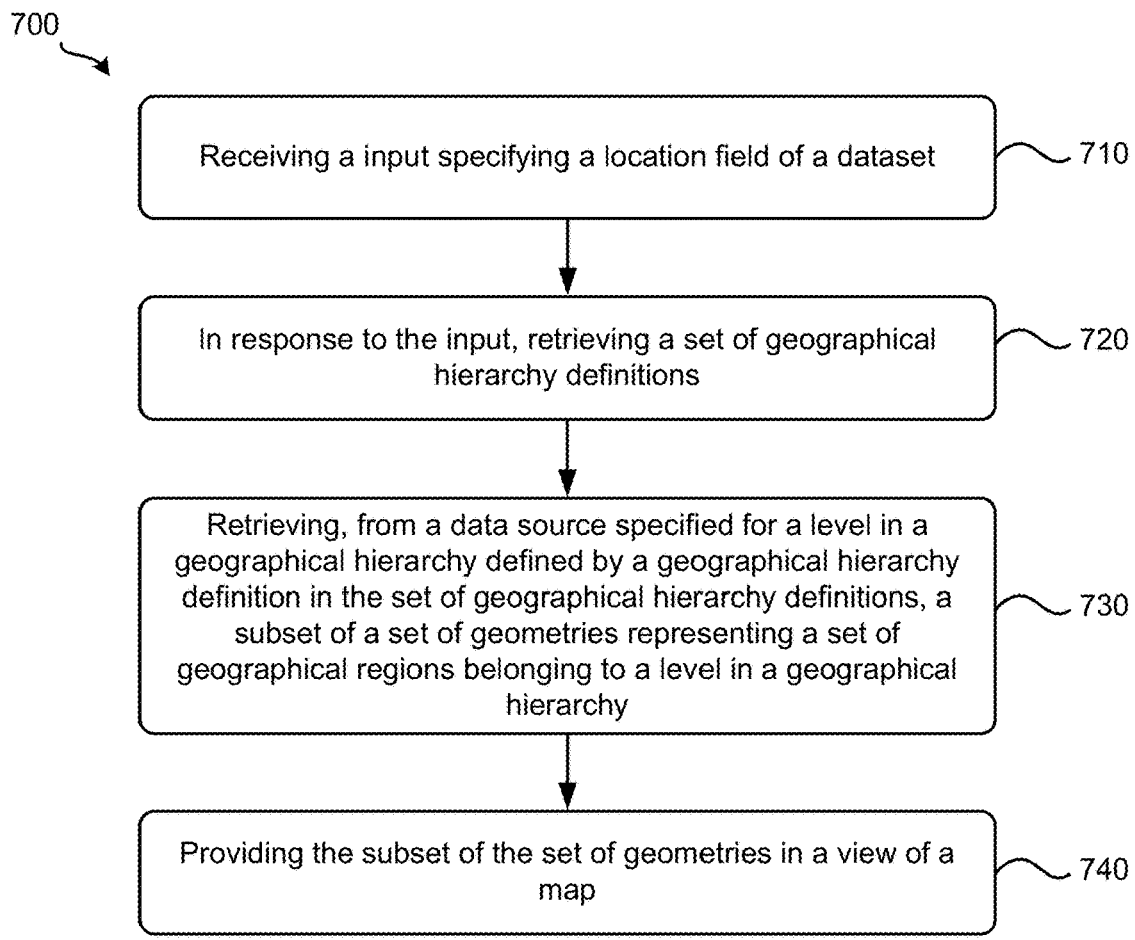
FIG. 7 illustrates a process for providing geographical regions of geographical hierarchies according to some embodiments.

FIG. 7 illustrates a process 700 for providing geographical regions of geographical hierarchies according to some embodiments. In some embodiments, computing system 110 performs process 700. Process 700 starts by receiving, at 710, an input specifying a location field of a dataset. The dataset may include a set of records. Each record in the set of records can include the location field and a set of fields. The location field may be configured to store a spatial point. Next, in response to the input, process 700 retrieves, at 720, a set of geographical hierarchy definitions. Each geographical hierarchy definition in the set of hierarchy definitions may include a number of levels in a geographical hierarchy and a data source for each level in the geographical hierarchy.

Process 700 then retrieves, at 730, from the data source specified for a level in the geographical hierarchy defined by a geographical hierarchy definition in the set of geographical hierarchy definitions, a subset of a set of geometries representing a set of geographical regions belonging to the level in the geographical hierarchy. For each geometry in the subset of the set of geometries, at least one record in the dataset has a spatial point in the location field that may fall within the geometry. Finally, process 700 provides, at 740, the subset of the set of geometries in a view of a map.

Another example operation of the system 100 will now be described by reference to FIGS. 1-5 and 8-11. Table 200 will also be used as the data stored in hierarchy data storage 135 for this example. Additionally, tables 300, 400, and 500 are used in the same manner as the previous example operation. FIG. 8 illustrates example geometry data 800 used for focus operations according to some embodiments. For this example, geometry data 800 is stored in a storage (e.g., a local storage) accessible by data manager 120. As shown, geometry data 800 includes a number of records. Each record includes a geometry ID that unique identifies a geometry. The example records illustrated in FIG. 8 correspond to the geometries illustrated in tables 300 and 400. Each record also includes a set of Booleans. Each Boolean is configured to indicate whether a corresponding lower level in a geographical hierarchy to which the geometry identified by the geometry ID belongs has geometries representing geographical subregions of the geographical region represented by the geometry available. A Boolean value of "True" indicates that the corresponding lower level in the geographical hierarchy has geometries representing geographical subregions of the geographical region represented by the geometry available. A Boolean value of "False" indicates that the corresponding lower level in the geographical hierarchy does not have any geometries representing geographical subregions of the geographical region represented by the geometry available.

This example operation starts when client device 105 displays GUI 600 illustrated in FIG. 6C on a display of client device. The user of client device 105 proceeds by invoking a context menu or drop-down menu that contains an option for focusing on the geographical region of Arizona and selecting the option in order to send application 115 a request to focus on the geographical region of Arizona in the view of the map 605 that intersects with at least one spatial point in a dataset. This example uses the same dataset in the previous example of store sales data of stores located in the United States.

Upon receiving the request, application 115 forwards it to data manager 120 for processing. Data manager 120 processes the request by identifying the "Region" level in the "Geographical Regions" geographical hierarchy to which the Arizona geographical region belongs and determining whether to transition to a level in the "Geographical Regions" geographical hierarchy lower than the "Region" level in the "Geographical Regions" geographical hierarchy. In this example, data manager 120 determines whether to transition to a level in the "Geographical Regions" geo-graphical hierarchy lower than the "Region" level in the "Geographical Regions" geographical hierarchy by accessing geometry data 800 and iterating through the records to identify the record with a geometry ID of 103, which is the geometry ID of Arizona, as shown in table 400 of FIG. 4. The geometry representing Arizona belongs to the second level in the "Geographical Regions" geographical hierarchy. Thus, the record for geometry ID 103 in geometry data 800 includes Booleans for levels 3 and 4, the levels lower than the level of Arizona in the "Geographical Regions" geographical hierarchy. Data manager 120 checks the Boolean value associated with level 3, which is the value "True".

As such, data manager 120 retrieves, from geometry data source 145a, as specified in the geographical hierarchy definition for the third level of the "Geographical Regions" geographical hierarchy, geometries representing geographical subregions of the Arizona geographical region that belong to the "Subregion 1" level in the "Geographical Regions" geographical hierarchy and intersect with at least one spatial point in the dataset. For this example, data manager 120 retrieves these geometries by generating a query for geometries representing geographical subregions of the Arizona geographical region that belong to the "Subregion 1" level in the "Geographical Regions" geographical hierarchy and intersect with at least one spatial point in the dataset and sending it to query processor 130 for processing.

To process such a query, query processor 130 retrieves the dataset from dataset data storage 140, retrieves geometries from geometry data source 145a, and performs an intersection operation on the spatial points in the dataset, the retrieved geometries, and the geometry representing Arizona to identify geometries in the retrieved geometries that are encompassed by the Arizona geometry and that intersect with at least one spatial point in the dataset. Query processor 130 then sends the identified geometries to data manager 120, which forwards them to application 115. After receiving the geometries, application 115 generates a view of a map that includes the geometries in the manner described above and provides the view of the map to client device 105. Client device 105 then displays the view of the map on the display of the client device 105.

Figure 9:
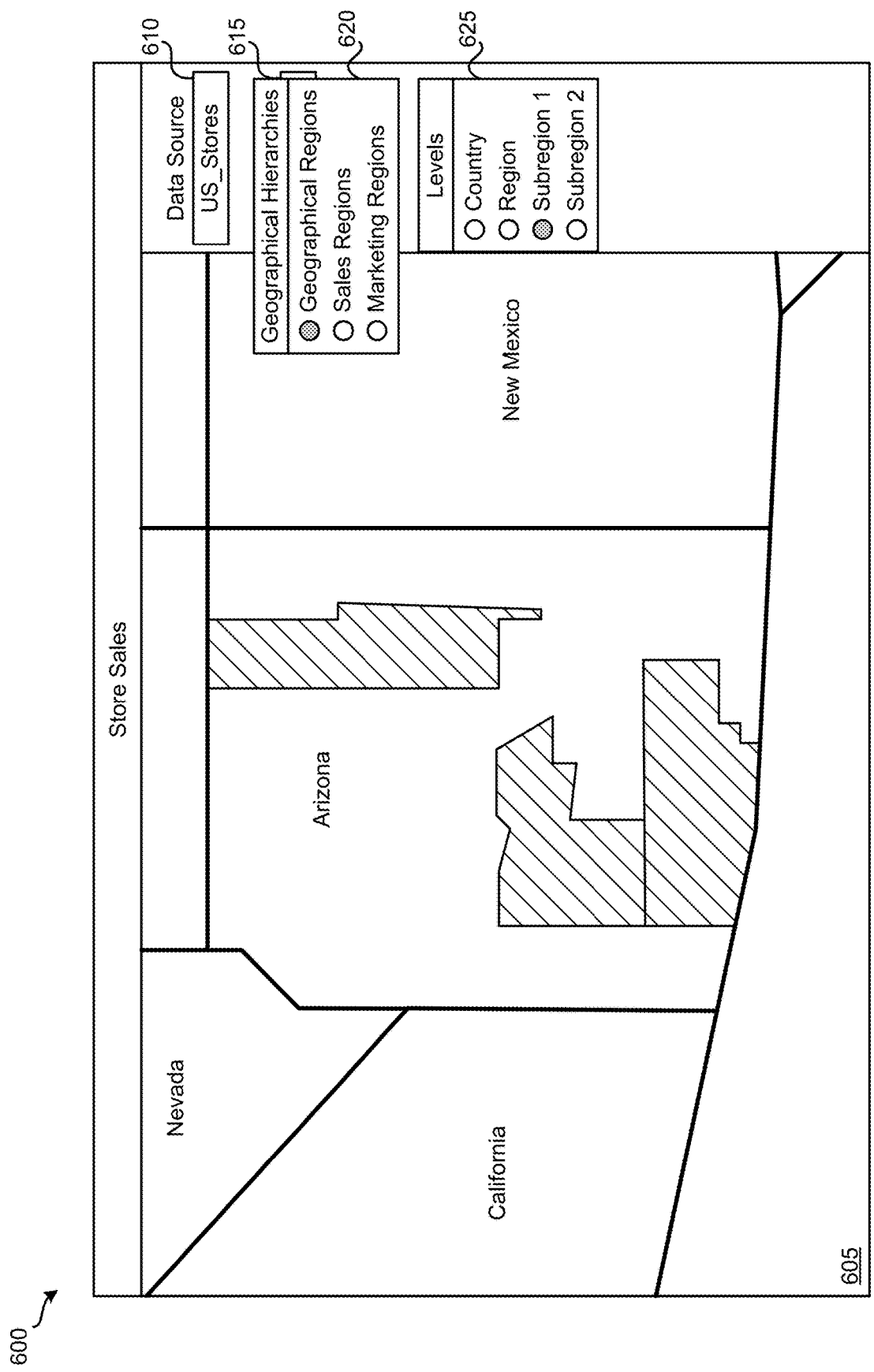
FIG. 9 illustrates an example of focusing on a geographical region according to some embodiments.

FIG. 9 illustrates an example of focusing on a geographical region according to some embodiments. Specifically, FIG. 9 shows GUI 600 after client device 105 displays on a display of the client device 105 the view of the map that includes geometries representing geographical subregions of the Arizona geographical region that belong to the "Subregion 1" level in the "Geographical Regions" geographical hierarchy and intersect with at least one spatial point in the dataset. For this example, the geometries representing the several counties of Arizona intersect with the store locations in the dataset. As illustrated, the view of the map 605 shows geometries, indicated by shapes covered with diagonal lines, representing the several counties of Arizona rendered over the view of the map 605. GUI 600 of FIG. 9 also shows the "Geographical Regions" option is selected in UI control 20 and the "Subregion 1" level is selected in UI control 625 as the view of the map 605 includes geometries representing geographical regions belonging to the "Subregion 1" level in the "Geographical Regions" geographical hierarchy.

In the example above, the Booleans for the record associated with the geometry for Arizona in geometry data 800 indicated that geometries representing geographical subregions of Arizona were available. In some embodiments, when geometries representing geographical subregions of a particular geographical region are not available (i.e., the Booleans have a value of "False" or the particular geographical region belongs to the lowest level in a geographical hierarchy), data manager 120 retrieves spatial points in the dataset that intersect with the particular geographical region. In some embodiments, data manager 120 retrieves the spatial points by generating a query for spatial points in the dataset that intersect with the particular geographical region and sending it to computing system 125 for processing.

Query processor 130 processes the query by retrieving the dataset from dataset data storage 140 and performing an intersection operation on the spatial points in the dataset and the particular geometry to identify spatial points in the dataset that intersect with the particular geometry. Then, query processor 130 sends the identified spatial points to data manager 120, which forwards them to application 115. In response, application 115 generates a view of a map that includes the spatial points by retrieving map data (e.g., raster tiles, vector base maps, etc.) for the view of the map from another computing system (e.g., a third party system that provides map data), rendering the view of the map based on the map data, and rendering the spatial points in the view of the map. Application 115 sends the view of the map to client device, which displays the view of the map on the display of the client device 105.

Figure 10:
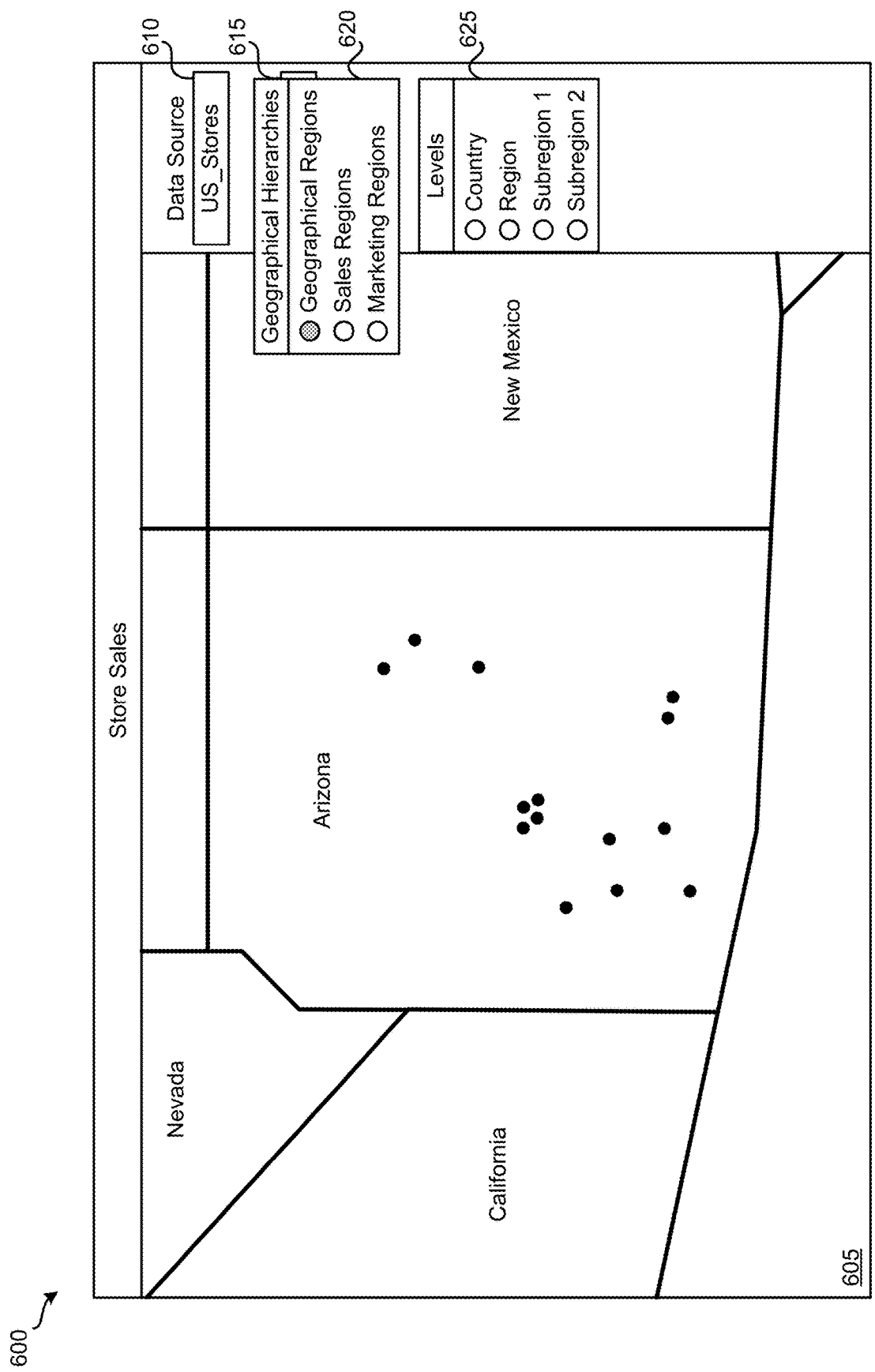
FIG. 10 illustrates another example of focusing on a geographical region according to some embodiments.

FIG. 10 illustrates another example of focusing on a geographical region according to some embodiments. In particular, GUI 600 of FIG. 10 shows the view of the map 605 in the case where geometries representing geographical subregions of the Arizona geographical region are not available. As shown, the view of the map 605 that includes spatial points in the dataset that intersect with the geometry representing Arizona. In this example, the spatial points representing the locations of stores in the state of Arizona. In addition, GUI 600 of FIG. 10 shows the "Geographical Regions" option is selected in UI control 20 and no level selected in UI control 625 as the view of the map 605 includes spatial points in the dataset, which do not belong to any level in the "Geographical Regions" geographical hierarchy.

The example above describes data manager 120 determining whether to transition to a level in the "Geographical Regions" geographical hierarchy lower than the "Region" level in the "Geographical Regions" geographical hierarchy based on geometry data structure like that illustrated in FIG. 8. In some embodiments, data manager 120 determining whether to transition to a level in the "Geographical Regions" geographical hierarchy lower than the "Region" level in the geographical hierarchy using another technique. With this technique, when data manager 120 generated the query for geometries representing geographical regions belonging to the "Region" level in the "Geographical Regions" geographical hierarchy and intersect with at least one spatial point in the dataset (which produced the geometries representing the states of Nevada, Arizona, New Mexico, and Texas), data manager 120 also includes in the query a request for a measure value (e.g., a store sales amount) associated with each record having a spatial point that intersects with one of those geometries. Thus, in addition to the requested geometries, data manager 120 also receives from query processor 130 the measure values associated with each spatial point that intersects with the requested geometries.

Data manager 120 then calculates, for each geometry, a sum of the measure values of the spatial points that intersect with the geometry and stores these sums. So, for the example describe with respect to FIG. 6C, data manager 120 is storing the sum of all the measure values of spatial points that intersect the geometry representing Nevada, the sum of all the measure values of spatial points that intersect the geometry representing Arizona, the sum of all the measure values of spatial points that intersect the geometry representing New Mexico, and the sum of all the measure values of spatial points that intersect the geometry representing Texas.

Now, to determine whether to transition to a level in the "Geographical Regions" geographical hierarchy lower than the "Region" level in the "Geographical Regions" geographical hierarchy, data manager 120, data manager 120 first determines whether the Arizona geographical region has missing geographical subregions. In some embodiments, data manager 120 makes this determination by generating a query for geometries belonging to one level below the "Region" level in the "Geographical Regions" geographical hierarchy, which is the "Subregion 1" level in this example, that are encompassed by the geometry for Arizona and intersect with at least one spatial point in the dataset. Data manager 120 also includes in the query a request for the same measure value (e.g., a store sales amount) requested above that is associated with each record having a spatial point that intersects with one of those geometries.

Once query processor 130 processes the query, data manager 120 receives back geometries belonging to the "Subregion 1" level in the "Geographical Regions" geographical hierarchy that are encompassed by the geometry for Arizona and intersect with at least one spatial point in the dataset as well as the measure values associated with each spatial point that intersects with such geometries. Next, data manager 120 calculates a sum of the measure values of the spatial points that intersect with these geometries. Then, data manager 120 compares this sum with the sum of all the measure values of spatial points that intersect the geometry representing Arizona that was previously calculated and stored.

If the sums are equal, data manager 120 determines to transition to the "Subregion 1" level in the "Geographical Regions" geographical hierarchy. Otherwise, data manager 120 sends application 115 a message indicating that geographical region for Arizona has missing geographical subregions. In response to the message, application 115 provides client device 105 a notification indicating that the particular geographical region has missing geographical subregions. In addition, the notification includes a prompt for input as to whether to provide a view of a map with missing geographical subregions or to provide the view of the map with spatial points in the dataset.

Figure 11A:
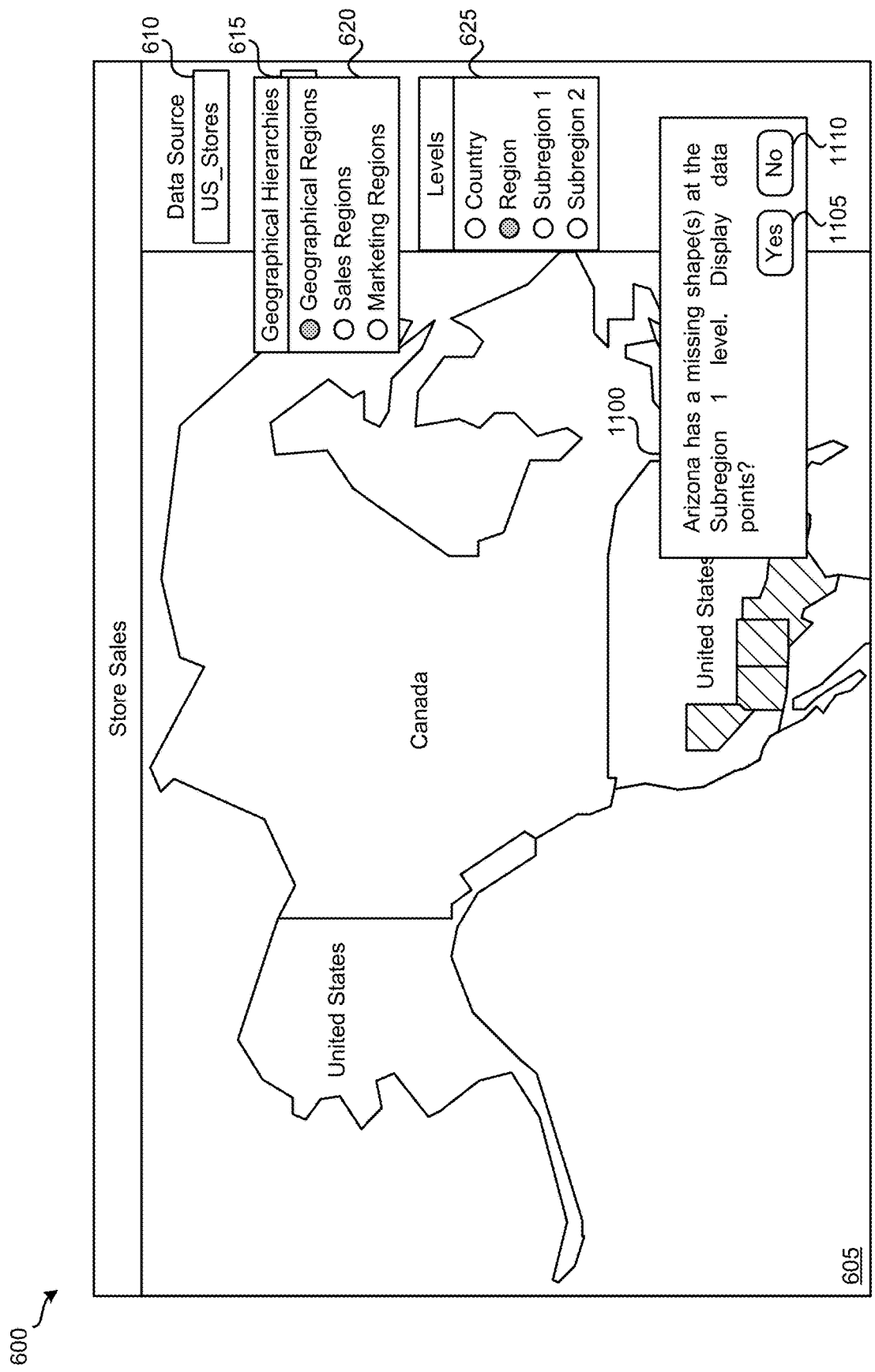
FIGS. 11A and 11B illustrate another example an example of focusing on a geographical region according to some embodiments.

FIG. 11A illustrates another example an example of focusing on a geographical region according to some embodiments. In particular, GUI 600 in FIG. 11A is GUI 600 in FIG. 6C after data manager 120 sends application 115 a message indicating that geographical region for Arizona has missing geographical subregions. Application 115, in turn, provides client device 105 a notification indicating that the particular geographical region has missing geographical subregions and including a prompt for input as to whether to provide a view of a map with missing geographical subregions or to provide the view of the map with spatial points in the dataset. As illustrated, FIG. 11A includes notification 1100, which includes text indicating that the Arizona geographical region has missing geographical subregions. Notification 1100 also includes a prompt for input as to whether to provide a view of a map with missing geographical subregions of the Arizona geographical region or to provide the view of the map with spatial points in the dataset. In addition, notification 1100 includes UI controls 1105 and 1110. UI control 1105 is for indicating to provide a view of a map with spatial points in the dataset. UI control 1110 is for indicating to provide a view of a map with missing geographical subregions of the Arizona geographical region.

Figure 11B:
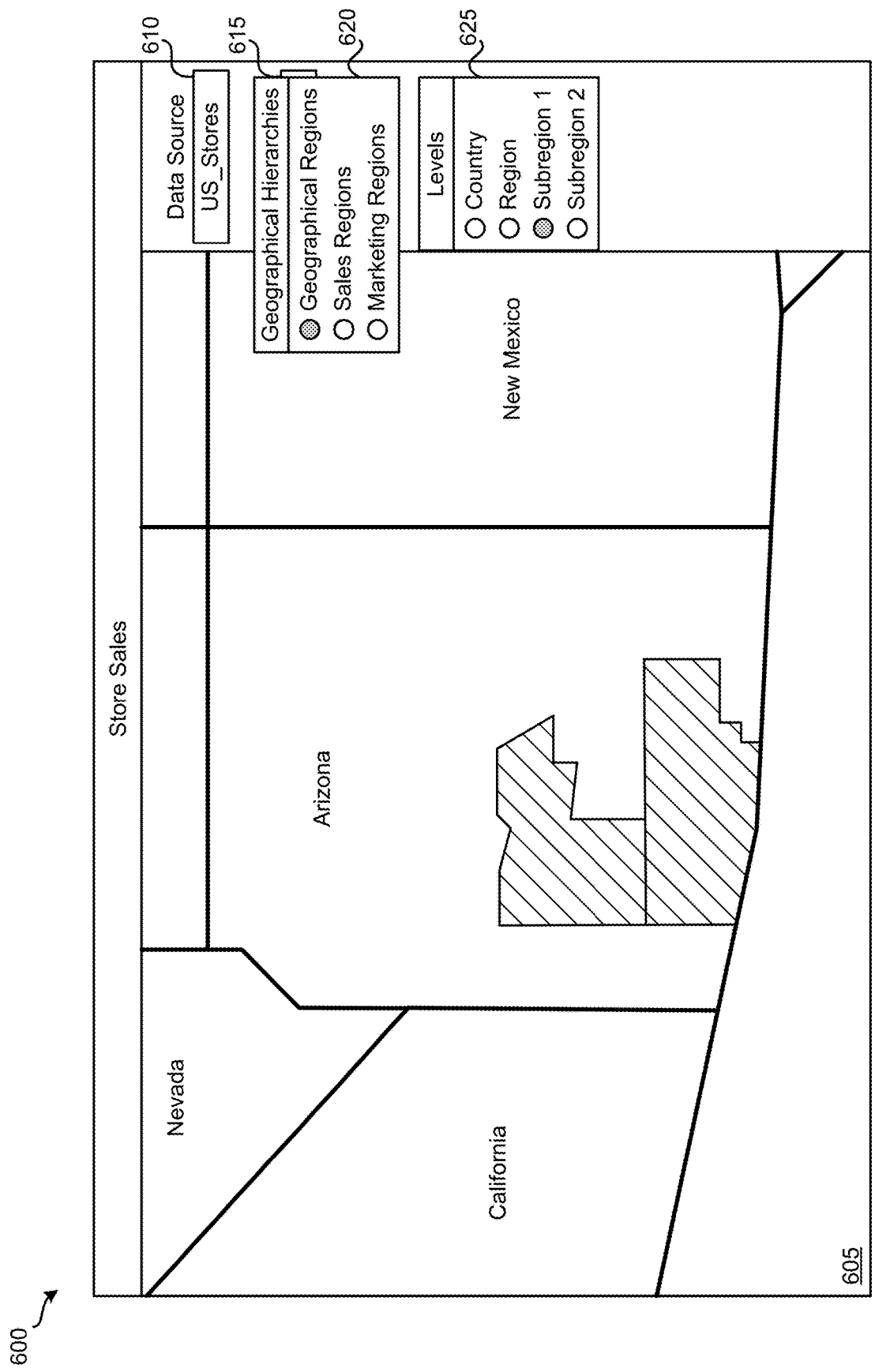

If application 115 receives an indication from client device 105 to provide the view of the map with missing geographical subregions, application 115 forwards it to data manager 120. In response, data manager 120 retrieves, from geometry data source 145a specified for the "Subregion 1" level in the "Geographical Regions" geographical hierarchy, geometries representing geographical subregions of the Arizona geographical region that belong to the "Subregion 1" level in the "Geographical Regions" geographical hierarchy and intersect with at least one spatial point in the dataset in the manner described above. Data manager 120 sends application 115 the geometries representing geographical subregions of the Arizona geographical region that intersect spatial points in the dataset. Then, application 115 generates a view of a map with the geometries of geographical subregions of the particular geographical region in the manner described above and sends it to client device 105 for display on the display of client device 105. FIG. 11B illustrates another example an example of focusing on a geographical region according to some embodiments. Specifically, FIG. 11B illustrates client device 105 displaying a view of a map with missing geographical subregions of the Arizona geographical region in response to the user of client device 105 selecting UI control 1110. As shown, the view of the map 605 is missing one subregion of the Arizona geographical region (FIG. 9 shows the view of the map 605 without the missing subregion of the Arizona geographical region).

If application 115 receives an indication from client device 105 to provide the view of the map with spatial points in the dataset, application 115 forwards it to data manager 120. In response, data manager 120 retrieves spatial points in the dataset that intersect with the particular geographical region in the manner described above and sends them to application 115. When application 115 receives the spatial points, application 115 generates a view of a map that includes the spatial points in the manner described above and sends it to client device 105 for display on the display of client device 105. FIG. 10 illustrates client device 105 displaying a view of a map with spatial points in the dataset that intersect with the Arizona geographical region in response to the user of client device 105 selecting UI control 1105.

Figure 12:
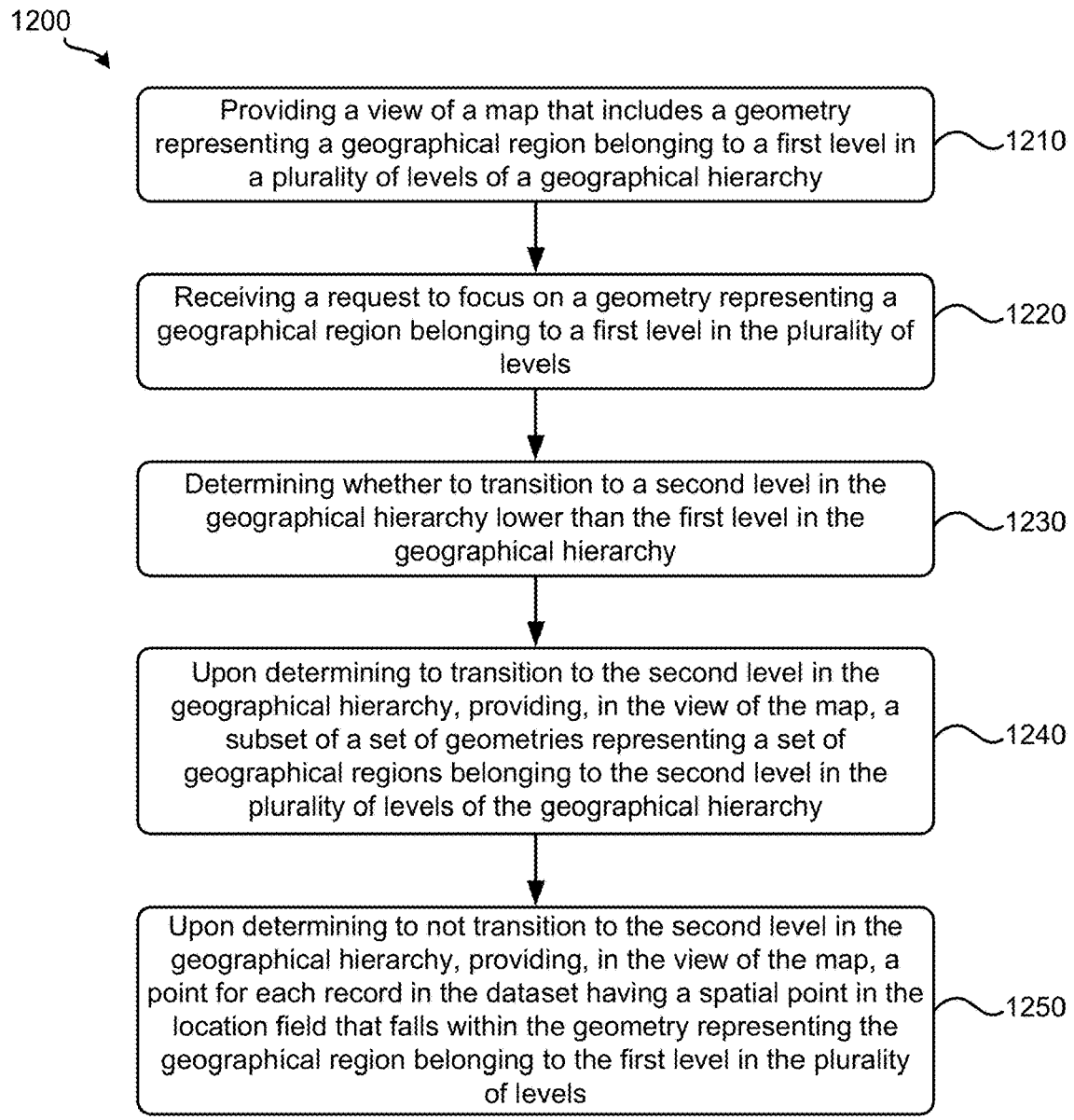
FIG. 12 illustrates a process for performing focus operations according to some embodiments.

FIG. 12 illustrates a process 1200 for performing focus operations according to some embodiments. In some embodiments, computing system 110 performs process 1200. Process 1200 begins by providing, at 1210, a view of a map that includes a geometry representing a geographical region belonging to a first level in a plurality of levels of a geographical hierarchy. At least one record in a dataset has a spatial point in a location field that may fall within the geometry.

Next, process 1200 receives, at 1220 a request to focus on a geometry representing a geographical region belonging to a first level in the plurality of levels. Process 1200 then determines, at 1230, whether to transition to a second level in the geographical hierarchy lower than the first level in the geographical hierarchy.

Upon determining to transition to the second level in the geographical hierarchy, process 1200 provides, at 1240, in the view of the map, a subset of a set of geometries representing a set of geographical regions belonging to the second level in the plurality of levels of the geographical hierarchy. For each geometry in the subset of the set of geometries, at least one record in a dataset has a spatial point in the location field that may fall within the geometry.

Finally, upon determining to not transition to the second level in the geographical hierarchy, process 1200 provides, at 1250, in the view of the map, a point for each record in the dataset having a spatial point in the location field that may fall within the geometry representing the geographical region belonging to the first level in the plurality of levels.

Figure 13:
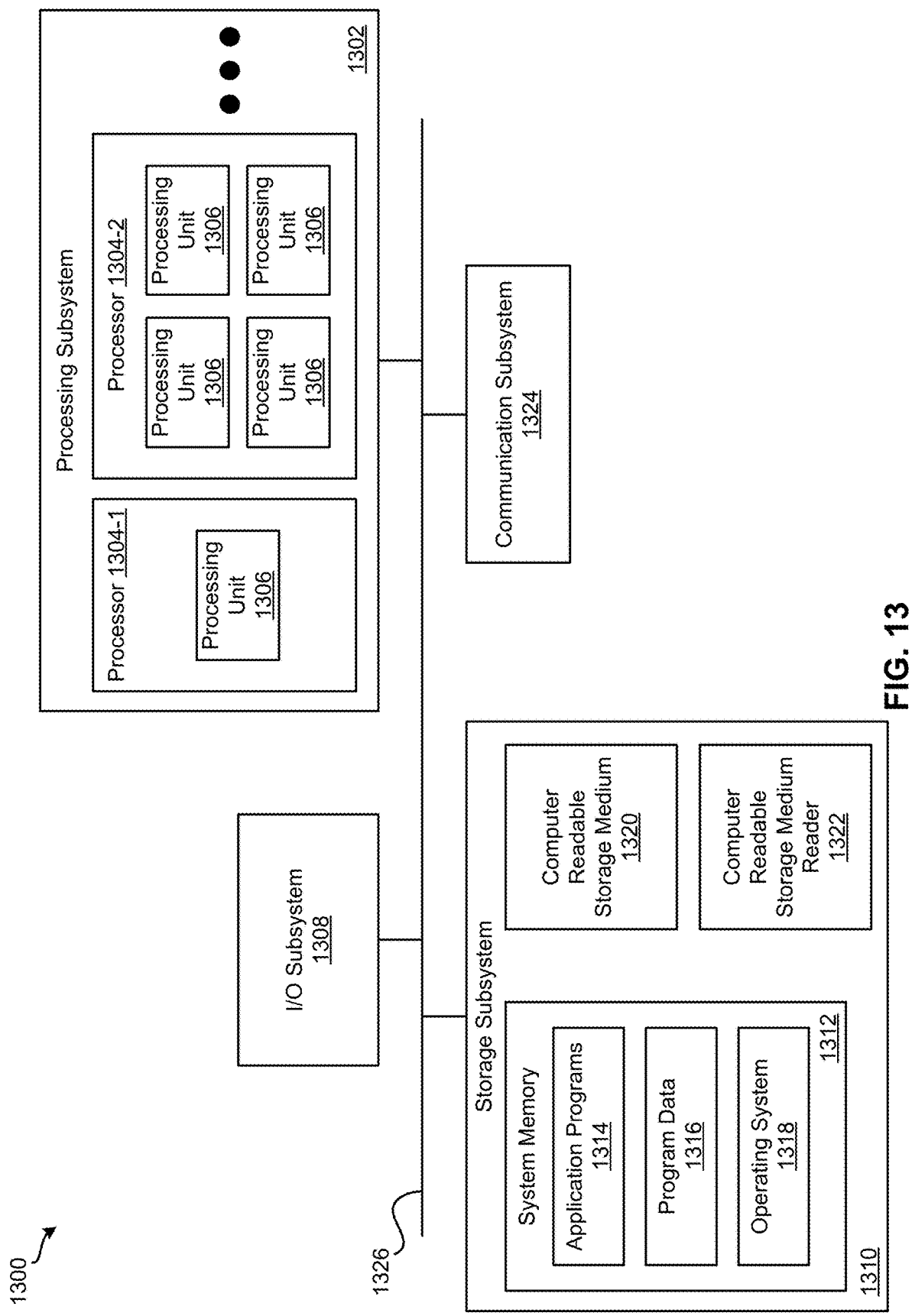
FIG. 13 illustrates an exemplary computer system, in which various embodiments may be implemented.

FIG. 13 illustrates an exemplary computer system 1300 for implementing various embodiments described above. For example, computer system 1300 may be used to implement client device 105, computing system 110, and computing system 125. Computer system 1300 may be a desktop computer, a laptop, a server computer, or any other type of computer system or combination thereof. Some or all elements of application 115, data manager 120, query processor 130, or combinations thereof can be included or implemented in computer system 1300. In addition, computer system 1300 can implement many of the operations, methods, and/or processes described above (e.g., process 700 and process 1200). As shown in FIG. 13, computer system 1300 includes processing subsystem 1302, which communicates, via bus subsystem 1326, with input/output (I/O) subsystem 1308, storage subsystem 1310 and communication subsystem 1324.

Bus subsystem 1326 is configured to facilitate communication among the various components and subsystems of computer system 1300. While bus subsystem 1326 is illustrated in FIG. 13 as a single bus, one of ordinary skill in the art will understand that bus subsystem 1326 may be implemented as multiple buses. Bus subsystem 1326 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 1302, which can be implemented as one or more integrated circuits (e.g., a conventional microprocessor or microcontroller), controls the operation of computer system 1300. Processing subsystem 1302 may include one or more processors 1304. Each processor 1304 may include one processing unit 1306 (e.g., a single core processor such as processor 1304-1) or several processing units 1306 (e.g., a multicore processor such as processor 1304-2). In some embodiments, processors 1304 of processing subsystem 1302 may be implemented as independent processors while, in other embodiments, processors 1304 of processing subsystem 1302 may be implemented as multiple processors integrate into a single chip or multiple chips. Still, in some embodiments, processors 1304 of processing subsystem 1302 may be implemented as a combination of independent processors and multiple processors integrated into a single chip or multiple chips.

In some embodiments, processing subsystem 1302 can execute a variety of programs or processes in response to program code and can maintain multiple concurrently executing programs or processes. At any given time, some or all of the program code to be executed can reside in processing subsystem 1302 and/or in storage subsystem 1310. Through suitable programming, processing subsystem 1302 can provide various functionalities, such as the functionalities described above by reference to process 700, process 1200, etc.

I/O subsystem 1308 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 1300 to a user or another device (e.g., a printer).

As illustrated in FIG. 13, storage subsystem 1310 includes system memory 1312, computer-readable storage medium 1320, and computer-readable storage medium reader 1322. System memory 1312 may be configured to store software in the form of program instructions that are loadable and executable by processing subsystem 1302 as well as data generated during the execution of program instructions. In some embodiments, system memory 1312 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 1312 may include different types of memory, such as static random access memory (SRAM) and/or dynamic random access memory (DRAM). System memory 1312 may include a basic input/output system (BIOS), in some embodiments, that is configured to store basic routines to facilitate transferring information between elements within computer system 1300 (e.g., during start-up). Such a BIOS may be stored in ROM (e.g., a ROM chip), flash memory, or any other type of memory that may be configured to store the BIOS.

As shown in FIG. 13, system memory 1312 includes application programs 1314 (e.g., application 115), program data 1316, and operating system (OS) 1318. OS 1318 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 1320 may be a non-transitory computer-readable medium configured to store software (e.g., programs, code modules, data constructs, instructions, etc.). Many of the components (e.g., application 115, data manager 120, and query processor 130) and/or processes (e.g., process 700 and process 1200) described above may be implemented as software that when executed by a processor or processing unit (e.g., a processor or processing unit of processing subsystem 1302) performs the operations of such components and/or processes. Storage subsystem 1310 may also store data used for, or generated during, the execution of the software.

Storage subsystem 1310 may also include computer-readable storage medium reader 1322 that is configured to communicate with computer-readable storage medium 1320. Together and, optionally, in combination with system memory 1312, computer-readable storage medium 1320 may comprehensively represent remote, local, fixed, and/or removable storage devices plus storage media for temporarily and/or more permanently containing, storing, transmitting, and retrieving computer-readable information.

Computer-readable storage medium 1320 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 1324 serves as an interface for receiving data from, and transmitting data to, other devices, computer systems, and networks. For example, communication subsystem 1324 may allow computer system 1300 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 1324 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 1324 may provide components configured for wired communication (e.g., Ethernet) in addition to or instead of components configured for wireless communication.

One of ordinary skill in the art will realize that the architecture shown in FIG. 13 is only an example architecture of computer system 1300, and that computer system 1300 may have additional or fewer components than shown, or a different configuration of components. The various components shown in FIG. 13 may be implemented in hardware, software, firmware or any combination thereof, including one or more signal processing and/or application specific integrated circuits.

Figure 14:
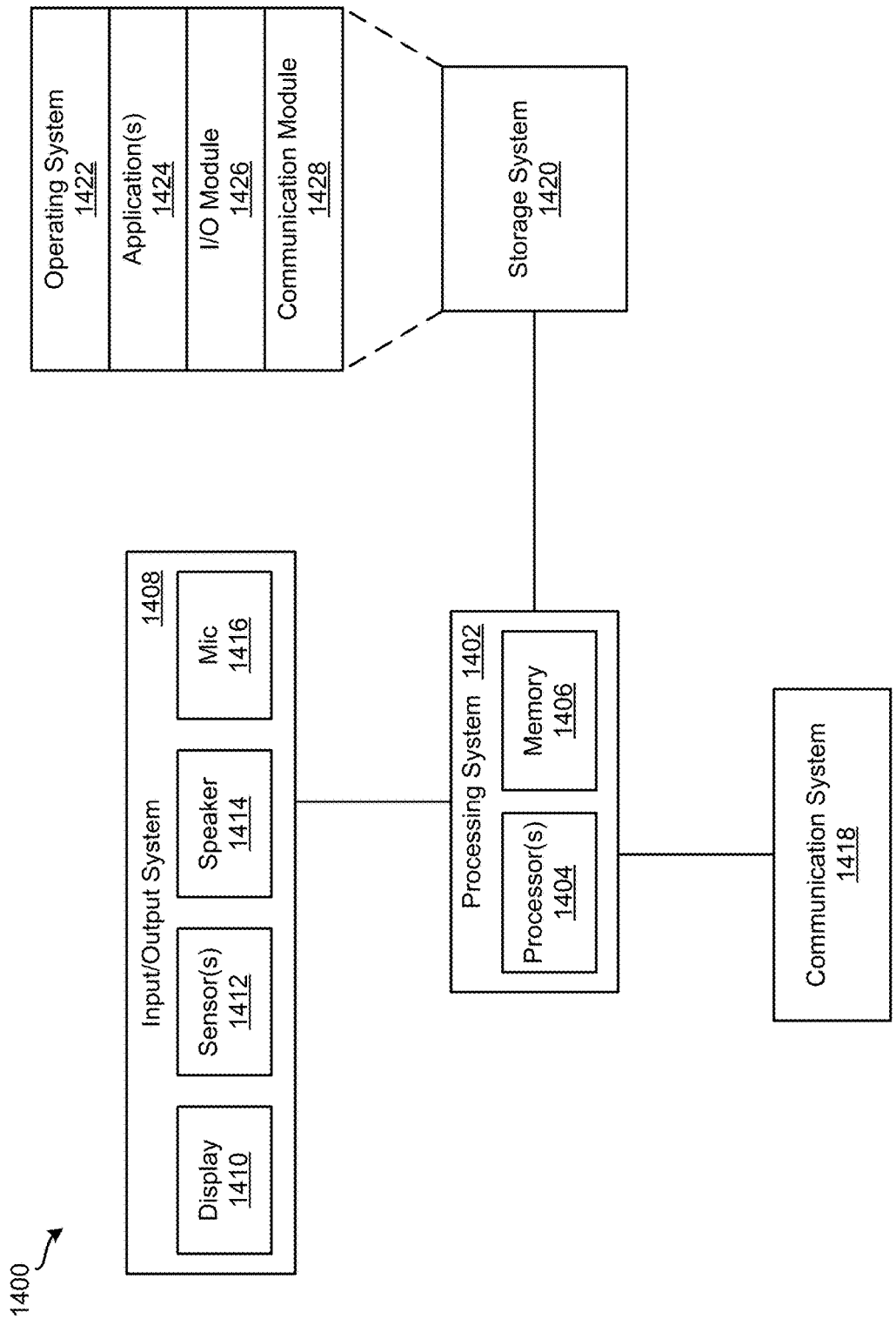
FIG. 14 illustrates an exemplary computing device, in which various embodiments may be implemented.

FIG. 14 illustrates an exemplary computing device 1400 for implementing various embodiments described above. For example, computing device 1400 may be used to implement client devices 105. Computing device 1400 may be a cellphone, a smartphone, a wearable device, an activity tracker or manager, a tablet, a personal digital assistant (PDA), a media player, or any other type of mobile computing device or combination thereof. As shown in FIG. 14, computing device 1400 includes processing system 1402, input/output (I/O) system 1408, communication system

1418, and storage system 1420. These components may be coupled by one or more communication buses or signal lines.

Processing system 1402, which can be implemented as one or more integrated circuits (e.g., a conventional microprocessor or microcontroller), controls the operation of computing device 1400. As shown, processing system 1402 includes one or more processors 1404 and memory 1406. Processors 1404 are configured to run or execute various software and/or sets of instructions stored in memory 1406 to perform various functions for computing device 1400 and to process data.

Each processor of processors 1404 may include one processing unit (e.g., a single core processor) or several processing units (e.g., a multicore processor). In some embodiments, processors 1404 of processing system 1402 may be implemented as independent processors while, in other embodiments, processors 1404 of processing system 1402 may be implemented as multiple processors integrate into a single chip. Still, in some embodiments, processors 1404 of processing system 1402 may be implemented as a combination of independent processors and multiple processors integrated into a single chip.

Memory 1406 may be configured to receive and store software (e.g., operating system 1422, applications 1424, I/O module 1426, communication module 1428, etc. from storage system 1420) in the form of program instructions that are loadable and executable by processors 1404 as well as data generated during the execution of program instructions. In some embodiments, memory 1406 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 1408 is responsible for receiving input through various components and providing output through various components. As shown for this example, I/O system 1408 includes display 1410, one or more sensors 1412, speaker 1414, and microphone 1416. Display 1410 is configured to output visual information (e.g., a graphical user interface (GUI) generated and/or rendered by processors 1404). In some embodiments, display 1410 is a touch screen that is configured to also receive touch-based input. Display 1410 may be implemented using liquid crystal display (LCD) technology, light-emitting diode (LED) technology, organic LED (OLED) technology, organic electro luminescence (OEL) technology, or any other type of display technologies. Sensors 1412 may include any number of different types of sensors for measuring a physical quantity (e.g., temperature, force, pressure, acceleration, orientation, light, radiation, etc.). Speaker 1414 is configured to output audio information and microphone 1416 is configured to receive audio input. One of ordinary skill in the art will appreciate that I/O system 1408 may include any number of additional, fewer, and/or different components. For instance, I/O system 1408 may include a keypad or keyboard for receiving input, a port for transmitting data, receiving data and/or power, and/or communicating with another device or component, an image capture component for capturing photos and/or videos, etc.

Communication system 1418 serves as an interface for receiving data from, and transmitting data to, other devices, computer systems, and networks. For example, communication system 1418 may allow computing device 1400 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 1418 can include any number of different communication components. Examples of such components may include radio frequency (RF) transceiver components for accessing wireless Voice and/or data networks (e.g., Using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 1418 may provide components configured for wired communication (e.g., Ethernet) in addition to or instead of components configured for wireless communication.

Storage system 1420 handles the storage and management of data for computing device 1400. Storage system 1420 may be implemented by one or more non-transitory machine-readable mediums that are configured to store software (e.g., programs, code modules, data constructs, instructions, etc.) and store data used for, or generated during, the execution of the software.

In this example, storage system 1420 includes operating system 1422, one or more applications 1424, I/O module 1426, and communication module 1428. Operating system 1422 includes various procedures, sets of instructions, software components and/or drivers for controlling and managing general system tasks (e.g., memory management, storage device control, power management, etc.) and facilitates communication between various hardware and software components. Operating system 1422 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 1424 can include any number of different applications installed on computing device 1400. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 1426 manages information received via input components (e.g., display 1410, sensors 1412, and microphone 1416) and information to be outputted via output components (e.g., display 1410 and speaker 1414). Communication module 1428 facilitates communication with other devices via communication system 1418 and includes various software components for handling data received from communication system 1418.

One of ordinary skill in the art will realize that the architecture shown in FIG. 14 is only an example architecture of computing device 1400, and that computing device 1400 may have additional or fewer components than shown, or a different configuration of components. The various components shown in FIG. 14 may be implemented in hardware, software, firmware or any combination thereof, including one or more signal processing and/or application specific integrated circuits.

Figure 15:
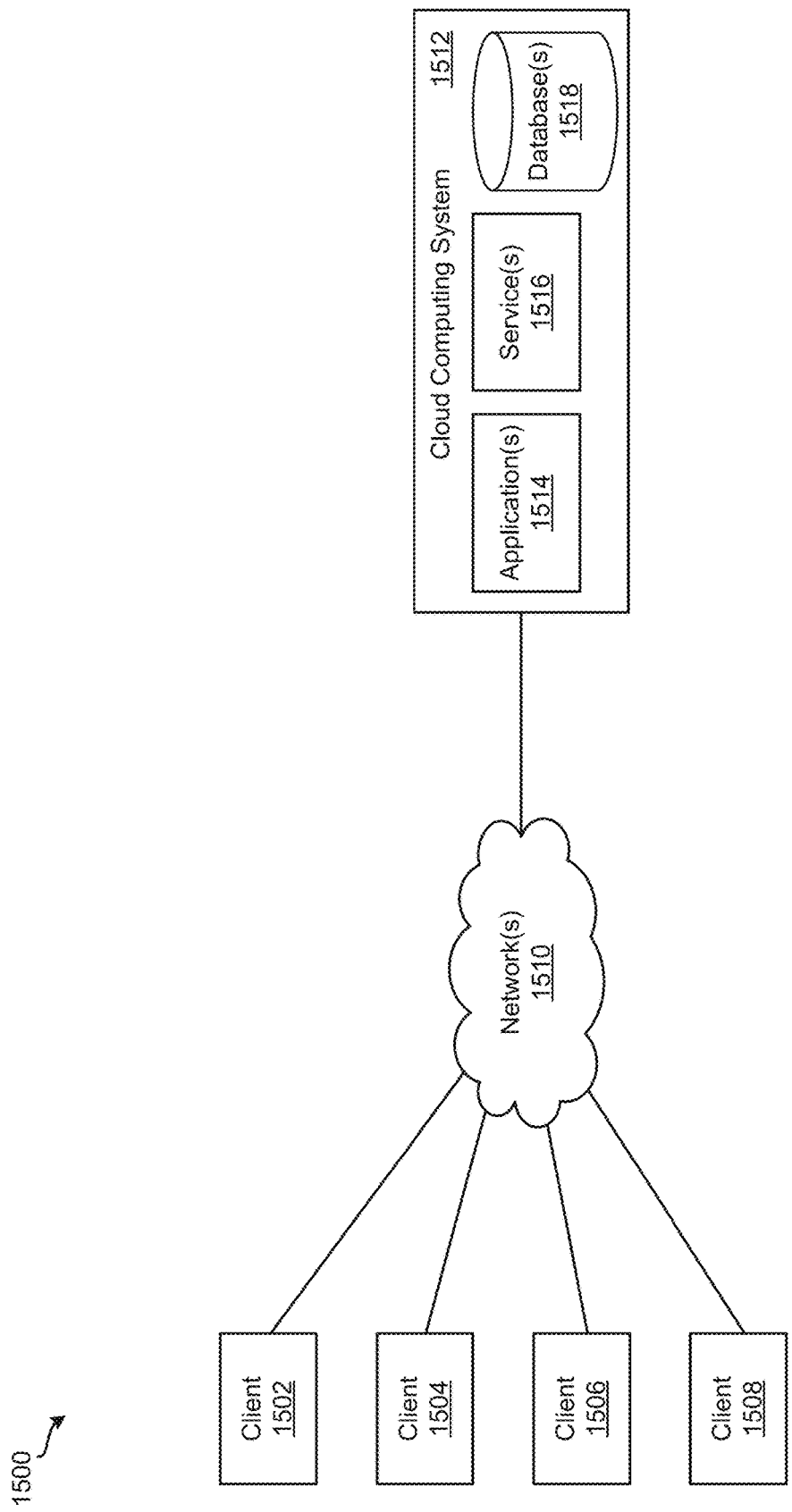
FIG. 15 illustrates an exemplary system, in which various embodiments may be implemented.

FIG. 15 illustrates an exemplary system 1500 for implementing various embodiments described above. For example, cloud computing system 1512 of system 1500 may be used to implement computing system 110 and/or computing system 125 and one of client devices 1502-1508 may be used to implement client device 105. As shown, system 1500 includes client devices 1502-1508, one or more networks 1510, and cloud computing system 1512. Cloud computing system 1512 is configured to provide resources and data to client devices 1502-1508 via networks 1510. In some embodiments, cloud computing system 1500 provides resources to any number of different users (e.g., customers, tenants, organizations, etc.). Cloud computing system 1512 may be implemented by one or more computer systems (e.g., servers), virtual machines operating on a computer system, or a combination thereof.

As shown, cloud computing system 1512 includes one or more applications 1514, one or more services 1516, and one or more databases 1518. Cloud computing system 1500 may provide applications 1514, services 1516, and databases 1518 to any number of different customers in a self-service, subscription-based, elastically scalable, reliable, highly available, and secure manner.

In some embodiments, cloud computing system 1500 may be adapted to automatically provision, manage, and track a customer's subscriptions to services offered by cloud computing system 1500. Cloud computing system 1500 may provide cloud services via different deployment models. For example, cloud services may be provided under a public cloud model in which cloud computing system 1500 is owned by an organization selling cloud services and the cloud services are made available to the general public or different industry enterprises. As another example, cloud services may be provided under a private cloud model in which cloud computing system 1500 is operated solely for a single organization and may provide cloud services for one or more entities within the organization. The cloud services may also be provided under a community cloud model in which cloud computing system 1500 and the cloud services provided by cloud computing system 1500 are shared by several organizations in a related community. The cloud services may also be provided under a hybrid cloud model, which is a combination of two or more of the aforementioned different models.

In some instances, any one of applications 1514, services 1516, and databases 1518 made available to client devices 1502-1508 via networks 1510 from cloud computing system 1500 is referred to as a "cloud service." Typically, servers and systems that make up cloud computing system 1500 are different from the on-premises servers and systems of a customer. For example, cloud computing system 1500 may host an application and a user of one of client devices 1502-1508 may order and use the application via networks 1510.

Applications 1514 may include software applications that are configured to execute on cloud computing system 1512 (e.g., a computer system or a virtual machine operating on a computer system) and be accessed, controlled, managed, etc. via client devices 1502-1508. In some embodiments, applications 1514 may include server applications and/or mid-tier applications (e.g., HTTP (hypertext transport protocol) server applications, FTP (file transfer protocol) server applications, CGI (common gateway interface) server applications, JAVA server applications, etc.). Services 1516 are software components, modules, application, etc. that are configured to execute on cloud computing system 1512 and provide functionalities to client devices 1502-1508 via networks 1510. Services 1516 may be web-based services or on-demand cloud services.

Databases 1518 are configured to store and/or manage data that is accessed by applications 1514, services 1516, and/or client devices 1502-1508. For instance, storages 135 and 140 may be stored in databases 1518. Databases 1518 may reside on a non-transitory storage medium local to (and/or resident in) cloud computing system 1512, in a storage-area network (SAN), on a non-transitory storage medium local located remotely from cloud computing system 1512. In some embodiments, databases 1518 may include relational databases that are managed by a relational database management system (RDBMS). Databases 1518 may be a column-oriented databases, row-oriented databases, or a combination thereof. In some embodiments, some or all of databases 1518 are in-memory databases. That is, in some such embodiments, data for databases 1518 are stored and managed in memory (e.g., random access memory (RAM)).

Client devices 1502-1508 are configured to execute and operate a client application (e.g., a web browser, a proprietary client application, etc.) that communicates with applications 1514, services 1516, and/or databases 1518 via networks 1510. This way, client devices 1502-1508 may access the various functionalities provided by applications 1514, services 1516, and databases 1518 while applications 1514, services 1516, and databases 1518 are operating (e.g., hosted) on cloud computing system 1500. Client devices 1502-1508 may be computer system 1300 or computing device 1400, as described above by reference to FIGS. 13 and 14 respectively. Although system 1500 is shown with four client devices, any number of client devices may be supported.

Networks 1510 may be any type of network configured to facilitate data communications among client devices 1502-1508 and cloud computing system 1512 using any of a variety of network protocols. Networks 1510 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a device, the program comprising sets of instructions for:
   receiving an input specifying a location field of a dataset, the dataset comprising a set of records, each record in the set of records comprising the location field and a set of fields, the location field configured to store a spatial point;

in response to the input, retrieving a set of geographical hierarchy definitions, each geographical hierarchy definition in the set of hierarchy definitions comprising a number of levels in a geographical hierarchy and a data source for each level in the geographical hierarchy;

retrieving, from the data source specified for a first level in the geographical hierarchy defined by a geographical hierarchy definition in the set of geographical hierarchy definitions, a subset of a first set of geometries representing a first set of geographical regions belonging to the first level in the geographical hierarchy, wherein, for each geometry in the subset of the first set of geometries, at least one record in the dataset has a spatial point in the location field that falls within the geometry;

providing the subset of the first set of geometries in a view of a map;

receiving a selection of a second level in the geographical hierarchy defined by the geographical hierarchy definition, wherein the data source specified for the second level in the geographical hierarchy and the data source specified for the first level in the geographical hierarchy are different data sources; and in response to the selection of the second level, retrieving, from the data source specified for the second level in the geographical hierarchy, a subset of a second set of geometries representing a second set of geographical regions belonging to the second level in the geographical hierarchy, wherein each geometry in the subset of the second set of geometries has at least one record in the dataset with a spatial point in the location field that falls within the geometry.

2. The non-transitory machine-readable medium of claim 1, wherein the geographical hierarchy defined by the geographical hierarchy definition in the set of geographical hierarchy definitions is a first geographical hierarchy defined by a first geographical hierarchy definition in the set of geographical hierarchy definitions, wherein the program further comprises sets of instructions for:

receiving a selection of a second geographical hierarchy defined by a second geographical hierarchy definition in the set of geographical hierarchy definitions; and in response to the selection of the second geographical hierarchy definition, retrieving, from the data source specified for a level in the second geographical hierarchy, a subset of a third set of geometries representing a third set of geographical regions belonging to the level in the second geographical hierarchy, wherein each geometry in the subset of the third set of geometries has at least one record in the dataset with a spatial point in the location field that falls within the geometry.

3. The non-transitory machine-readable medium of claim 2, wherein the data source specified for the second level in the second geographical hierarchy and the data source specified for the first level in the first geographical hierarchy are different data sources.

4. The non-transitory machine-readable medium of claim 1, wherein retrieving the set of geographical hierarchy definitions comprises:

generating a query for the set of geographical hierarchy definitions;

sending the query to a computing system for execution; and receiving the set of geographical hierarchy definitions from the computing system.

5. The non-transitory machine-readable medium of claim 1, wherein retrieving the set of geographical hierarchy definitions comprises:

generating a query for the set of geographical hierarchy definitions;

executing the query on a database of the device; and receiving the set of geographical hierarchy definitions from the database.

6. A method comprising:

receiving an input specifying a location field of a dataset, the dataset comprising a set of records, each record in the set of records comprising the location field and a set of fields, the location field configured to store a spatial point;

in response to the input, retrieving a set of geographical hierarchy definitions, each geographical hierarchy definition in the set of hierarchy definitions comprising a number of levels in a geographical hierarchy and a data source for each level in the geographical hierarchy;

retrieving, from the data source specified for a first level in the geographical hierarchy defined by a geographical hierarchy definition in the set of geographical hierarchy definitions, a subset of a first set of geometries representing a first set of geographical regions belonging to the first level in the geographical hierarchy, wherein, for each geometry in the subset of the first set of geometries, at least one record in the dataset has a spatial point in the location field that falls within the geometry;

providing the subset of the first set of geometries in a view of a map;

receiving a selection of a second level in the geographical hierarchy defined by the geographical hierarchy definition, wherein the data source specified for the second level in the geographical hierarchy and the data source specified for the first level in the geographical hierarchy are different data sources; and in response to the selection of the second level, retrieving, from the data source specified for the second level in the geographical hierarchy, a subset of a second set of geometries representing a second set of geographical regions belonging to the second level in the geographical hierarchy, wherein each geometry in the subset of the second set of geometries has at least one record in the dataset with a spatial point in the location field that falls within the geometry.

7. The method of claim 6, wherein the geographical hierarchy defined by the geographical hierarchy definition in the set of geographical hierarchy definitions is a first geographical hierarchy defined by a first geographical hierarchy definition in the set of geographical hierarchy definitions, wherein the method further comprises:

receiving a selection of a second geographical hierarchy defined by a second geographical hierarchy definition in the set of geographical hierarchy definitions; and in response to the selection of the second geographical hierarchy definition, retrieving, from the data source specified for a level in the second geographical hierarchy, a subset of a third set of geometries representing a third set of geographical regions belonging to the level in the second geographical hierarchy, wherein each geometry in the subset of the third set of geometries has at least one record in the dataset with a spatial point in the location field that falls within the geometry.

8. The method of claim 7, wherein the data source specified for the second level in the second geographical hierarchy and the data source specified for the first level in the first geographical hierarchy are different data sources.

9. The method of claim 6, wherein retrieving the set of geographical hierarchy definitions comprises:
generating a query for the set of geographical hierarchy definitions;
sending the query to a computing system for execution; and
receiving the set of geographical hierarchy definitions from the computing system.

10. The method of claim 6, wherein retrieving the set of geographical hierarchy definitions comprises:
generating a query for the set of geographical hierarchy definitions;
executing the query on a database of the device; and
receiving the set of geographical hierarchy definitions from the database.

11. A system comprising:
a set of processors; and
a non-transitory machine-readable medium storing instructions that when executed by at least one processor in the set of processors cause the at least one processor to:
receive an input specifying a location field of a dataset, the dataset comprising a set of records, each record in the set of records comprising the location field and a set of fields, the location field configured to store a spatial point;
in response to the input, retrieve a set of geographical hierarchy definitions, each geographical hierarchy definition in the set of hierarchy definitions comprising a number of levels in a geographical hierarchy and a data source for each level in the geographical hierarchy;
retrieve, from the data source specified for a first level in the geographical hierarchy defined by a geographical hierarchy definition in the set of geographical hierarchy definitions, a subset of a first set of geometries representing a first set of geographical regions belonging to the first level in the geographical hierarchy, wherein, for each geometry in the subset of the first set of geometries, at least one record in the dataset has a spatial point in the location field that falls within the geometry;
provide the subset of the set of geometries in a view of a map;
receive a selection of a second level in the geographical hierarchy defined by the geographical hierarchy definition, wherein the data source specified for the second level in the geographical hierarchy and the data source specified for the first level in the geographical hierarchy are different data sources; and
in response to the selection of the second level, retrieve, from the data source specified for the second level in the geographical hierarchy, a subset of a second set of geometries representing a second set of geographical regions belonging to the second level in the geographical hierarchy, wherein each geometry in the subset of the second set of geometries has at least one record in the dataset with a spatial point in the location field that falls within the geometry.

12. The system of claim 11, wherein the geographical hierarchy defined by the geographical hierarchy definition in the set of geographical hierarchy definitions is a first geographical hierarchy defined by a first geographical hierarchy definition in the set of geographical hierarchy definitions, wherein the instructions further cause the at least one processor to:
receive a selection of a second geographical hierarchy defined by a second geographical hierarchy definition in the set of geographical hierarchy definitions; and
in response to the selection of the second geographical hierarchy definition, retrieve, from the data source specified for a level in the second geographical hierarchy, a subset of a third set of geometries representing a third set of geographical regions belonging to the level in the second geographical hierarchy, wherein each geometry in the subset of the third set of geometries has at least one record in the dataset with a spatial point in the location field that falls within the geometry.

13. The system of claim 12, wherein the data source specified for the second level in the second geographical hierarchy and the data source specified for the first level in the first geographical hierarchy are different data sources.

14. The system of claim 11, wherein retrieving the set of geographical hierarchy definitions comprises:
generating a query for the set of geographical hierarchy definitions;
sending the query to a computing system for execution; and
receiving the set of geographical hierarchy definitions from the computing system.

15. The non-transitory machine-readable medium of claim 2, wherein the data source specified for the first geographical hierarchy and the data source specified for the second geographical hierarchy are different data sources.

16. The method of claim 6, wherein the data source specified for the first geographical hierarchy and the data source specified for the second geographical hierarchy are different data sources.

17. The system of claim 11, wherein retrieving the set of geographical hierarchy definitions comprises:
generating a query for the set of geographical hierarchy definitions;
executing the query on a database of the device; and
receiving the set of geographical hierarchy definitions from the database.

18. The non-transitory machine-readable medium of claim 1, wherein the data sources for the levels in the geographical hierarchy are implemented in a same database.

19. The method of claim 6, wherein the data sources for the levels in the geographical hierarchy are implemented in a same database.

20. The system of claim 12, wherein the data source specified for the first geographical hierarchy and the data source specified for the second geographical hierarchy are different data sources.

* * * * *